(12) United States Patent
Cho et al.

(10) Patent No.: US 12,362,475 B2
(45) Date of Patent: Jul. 15, 2025

(54) ANTENNA SWITCHING METHOD IN ELECTRONIC DEVICE, AND DEVICE THEREFOR

(71) Applicant: Samsung Electronics Co., Ltd., Suwon-si (KR)

(72) Inventors: Youngjun Cho, Suwon-si (KR); Yonghyun Yoon, Suwon-si (KR); Sungwon Kim, Suwon-si (KR); Gyubok Park, Suwon-si (KR); Byungman Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 18/164,209

(22) Filed: Feb. 3, 2023

(65) Prior Publication Data

US 2023/0187823 A1 Jun. 15, 2023

Related U.S. Application Data

(63) Continuation of application No. PCT/KR2021/010172, filed on Aug. 3, 2021.

(30) Foreign Application Priority Data

Aug. 4, 2020 (KR) .................. 10-2020-0097477

(51) Int. Cl.
*H01Q 1/24* (2006.01)
*H01Q 3/24* (2006.01)
*H01Q 5/50* (2015.01)

(52) U.S. Cl.
CPC ............. *H01Q 3/24* (2013.01); *H01Q 1/241* (2013.01); *H01Q 5/50* (2015.01)

(58) Field of Classification Search
CPC .......... H01Q 1/24; H01Q 1/241; H01Q 1/243; H01Q 21/28; H01Q 3/24; H01Q 5/32;
(Continued)

(56) References Cited

U.S. PATENT DOCUMENTS 8,836,587 B2 * 9/2014 Darnell .................... H01Q 1/50
343/702
9,142,875 B2 9/2015 Kim
(Continued)

FOREIGN PATENT DOCUMENTS

CN 107317112 B 4/2020
EP 3 644 441 A1 4/2020
(Continued)

OTHER PUBLICATIONS

Korean Office Action dated Jun. 10, 2024, issued in Korean Application No. 10-2020-0097477.
(Continued)

*Primary Examiner* — Tho G Phan
(74) *Attorney, Agent, or Firm* — Jefferson IP Law, LLP

(57) ABSTRACT

An electronic device is provided. The electronic device includes a housing including a first portion formed of a conductive material, a printed circuit board disposed inside the housing and including a ground, a wireless communication circuit disposed to the printed circuit board and configured to supply power to the first portion of the housing through a feeding path, and a switch circuit. The switch circuit may include a first port connected to a first point of
(Continued)

the feeding path, a second port connected to a second point of the first portion, and a third port connected to the ground of the printed circuit board.

12 Claims, 24 Drawing Sheets

(58) Field of Classification Search
CPC . H01Q 5/328; H01Q 5/50; H01Q 9/42; H04B 1/00; H04B 1/006; H04B 1/18; H04B 1/40; H04B 1/401; H04M 1/02
See application file for complete search history.

(56) References Cited

U.S. PATENT DOCUMENTS

| | | | |
|---|---|---|---|
| 10,177,744 | B2 | 1/2019 | Tenbroek et al. |
| 10,374,641 | B2 | 8/2019 | Lim |
| 10,403,967 | B1 | 9/2019 | Kim et al. |
| 10,581,169 | B2 * | 3/2020 | Kim ................ H01Q 7/00 |
| 10,778,276 | B2 | 9/2020 | Kim et al. |
| 10,971,809 | B2 * | 4/2021 | Shin ................ H04M 1/026 |
| 11,239,867 | B2 * | 2/2022 | Park ................ H01Q 23/00 |
| 12,010,255 | B2 * | 6/2024 | Nam ................ H01Q 1/48 |
| 2009/0278750 | A1 | 11/2009 | Man et al. |
| 2011/0159832 | A1 | 6/2011 | Yamagajo et al. |
| 2012/0169567 | A1 | 7/2012 | Kim |
| 2019/0027821 | A1 | 1/2019 | Judkins et al. |
| 2019/0267990 | A1 | 8/2019 | Schleicher et al. |
| 2019/0312336 | A1 | 10/2019 | Son et al. |
| 2019/0393586 | A1 | 12/2019 | Ayala Vazquez et al. |
| 2020/0212571 | A1 | 7/2020 | Qiu et al. |

FOREIGN PATENT DOCUMENTS

| | | |
|---|---|---|
| JP | 5527011 B2 | 6/2014 |
| JP | 2018-029313 A | 2/2018 |
| KR | 10-2009-0117638 A | 11/2009 |
| KR | 10-2010-0020233 A | 2/2010 |
| KR | 10-1446248 B1 | 10/2014 |
| KR | 10-2018-0083219 A | 7/2018 |
| KR | 10-2019-0032684 A | 3/2019 |
| KR | 10-2019-0114630 A | 10/2019 |
| KR | 10-2020-0023921 A | 3/2020 |

OTHER PUBLICATIONS

Extended European Search Report dated Dec. 4, 2023; European Appln. No. 21852865.1-1206 / 4181406 PCT/KR2021010172.
International Search Report with Written Opinion dated Nov. 19, 2021; International Application No. PCT/KR2021/010172.
Korean Notice of Final Rejection dated Jan. 23, 2025, issued in Korean Application No. 10-2020-0097477.

* cited by examiner

ANTENNA SWITCHING METHOD IN ELECTRONIC DEVICE, AND DEVICE THEREFOR

CROSS-REFERENCE TO RELATED APPLICATION(S)

This application is a continuation application, claiming priority under § 365(c), of an International application No. PCT/KR2021/010172, filed on Aug. 3, 2021, which is based on and claims the benefit of a Korean patent application number 10-2020-0097477, filed on Aug. 4, 2020, in the Korean Intellectual Property Office, the disclosure of which is incorporated by reference herein in its entirety.

BACKGROUND

1. Field

The disclosure relates to an antenna switching method in an electronic device, and a device thereof.

2. Description of Related Art

Recently, an electronic device having a communication function has become small in size and light in weight, and includes various functions in which mobile communication services of different frequency bands are provided by using one electronic device. In addition, the electronic device may include a plurality of antennas to support the various functions.

The above information is presented as background information only to assist with an understanding of the disclosure. No determination has been made, and no assertion is made, as to whether any of the above might be applicable as prior art with regard to the disclosure.

SUMMARY

The electronic device may have difficulty in implementing multiple bands efficiently in a situation where a plurality of antennas shall be mounted among $2^{nd}$ generation (2G), $3^{rd}$ generation (3G), $4^{th}$ generation (4G), or $5^{th}$ generation (5G) related multiple input multiple output (MIMO) antennas.

In addition, a display area extends gradually with an increase in importance of design, which results in a decrease in a separation distance between a display and an antenna area. Therefore, it may be difficult to maintain antenna performance.

A first switching scheme may be a scheme of adding a switching circuit responsible for matching over the entire antenna resonance frequency by being coupled at a location of a feeding portion or feeding line. A second switching scheme may be a scheme of adding a switching circuit for switching of a designated frequency (e.g., a low band frequency) by disposing a matching element between a ground portion and a location of an antenna radiator, not the feeding portion or the feeding line.

In order to maintain antenna performance, the electronic device may include a matching circuit of the first switching scheme or second switching scheme. The first switching scheme is a switching scheme in which an antenna tuning switch is coupled between a feeding path and a ground, and a matching portion is varied by changing an element value to improve matching and a radiation efficiency at a specific frequency band. In addition, the second switching scheme has a structure in which an antenna tuning switch is coupled between a ground and any location of an antenna radiator. The second switching scheme is a switching scheme capable of shifting a resonance frequency by changing an element value or a location at which an antenna tuning switch is coupled.

The first switching scheme or the second switching scheme has a distinct advantage and disadvantage. The first switching scheme is advantageous in improving a radiation efficiency but has a narrow resonance shift range, and the second switching scheme has a wide resonance shift range but may be disadvantageous in improving a radiation efficiency. Therefore, when the electronic device implements only one switching scheme, a resonance shift range is narrow or a situation having difficulty in improving a radiation efficiency may occur.

In addition, when both a switch of the first switching scheme and a switch of the second switching scheme are to be disposed to an antenna of the electronic device, a radiation efficiency is decreased relatively compared to a case of using only the first switching scheme, and it may be difficult to ensure a sufficient space to dispose both the switches of the two schemes to a latest mobile communication device having a limited mounting space.

Aspects of the disclosure are to address at least the above-mentioned problems and/or disadvantages and to provide at least the advantages described below. Accordingly, an aspect of the disclosure is to provide an electronic device including a switching structure having advantages of the first switching scheme and second switching scheme, and a method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a printed circuit board disposed inside the housing and including a ground, a wireless communication circuit disposed to the printed circuit board, and a switch circuit. A first portion of the housing may be constructed of a conductive material. The wireless communication circuit may be configured to supply power to the first portion of the housing through a feeding path. The switch circuit may include a first port coupled to a first point of the feeding path, a second port coupled to a second point of the first portion, and a third port coupled to the ground of the printed circuit board.

In accordance with another aspect of the disclosure, a method performed by an electronic device for controlling an antenna is provided. The method includes a first portion of a housing of the electronic device may be constructed of a conductive material. The method may include supplying power, by a wireless communication circuit of the electronic device, to the first portion through a feeding path to receive a signal of a first frequency band, controlling a switch circuit of the electronic device such that a first point of the feeding path is electrically coupled to a ground of the electronic device through the switch circuit to control an impedance associated with reception of the signal of the first frequency band, and controlling the switch circuit such that the second point of the first portion is electrically coupled to the ground of the electronic device through the switch circuit to receive a signal of a second frequency band different from the first frequency band. The switch circuit may be selectively coupled to at least one of a first point of the feeding path and a second point of the first portion.

According to various embodiments disclosed in the disclosure, an electronic device may simultaneously implement a first switching scheme and a second switching scheme by changing an electrical coupling path of a switch (hereinafter, referred to as a third switching scheme), or may selectively implement the first switching scheme or the second switching scheme depending on a frequency band, thereby improving a resonance shift range and a radiation efficiency.

In addition, according to various embodiments, the electronic device may selectively implement only the first switching scheme to improve a radiation efficiency at a low frequency band equal to or less than 1300 megahertz (MHz) approximately, or may simultaneously implement the first switching scheme and the second switching scheme to improve a radiation efficiency at a band of 1500 to 2000 MHz.

In addition, according to various embodiments, at least one switch circuit of the electronic device may be coupled to a first portion of a housing to construct at least one resonance path, thereby providing an advantage of improving a radiation efficiency at one or more frequency bands.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
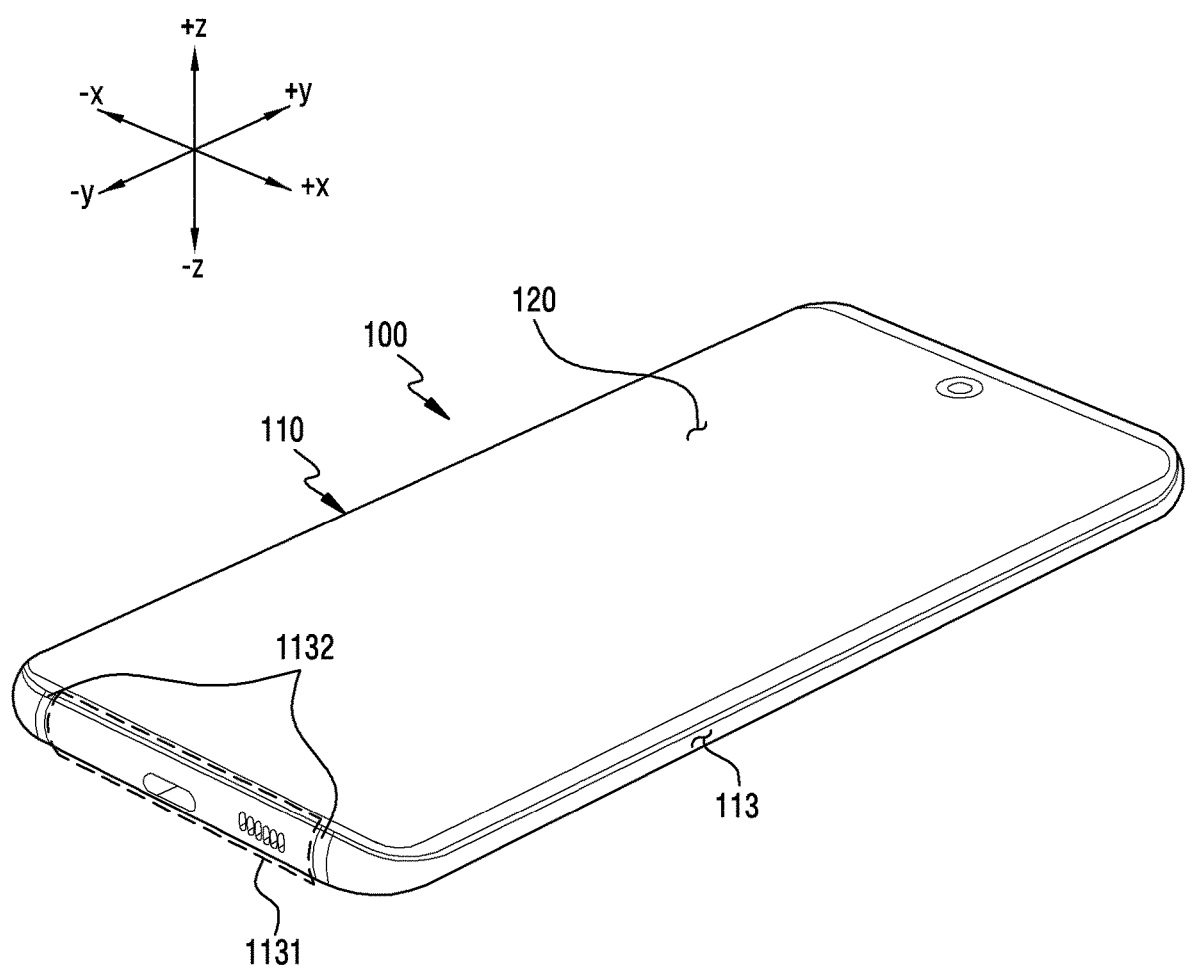
FIG. 1A illustrates a front face of an electronic device according to an embodiment of the disclosure.

FIG. 1A illustrates a front face of an electronic device 100 according to an embodiment of the disclosure.

Figure 1B:
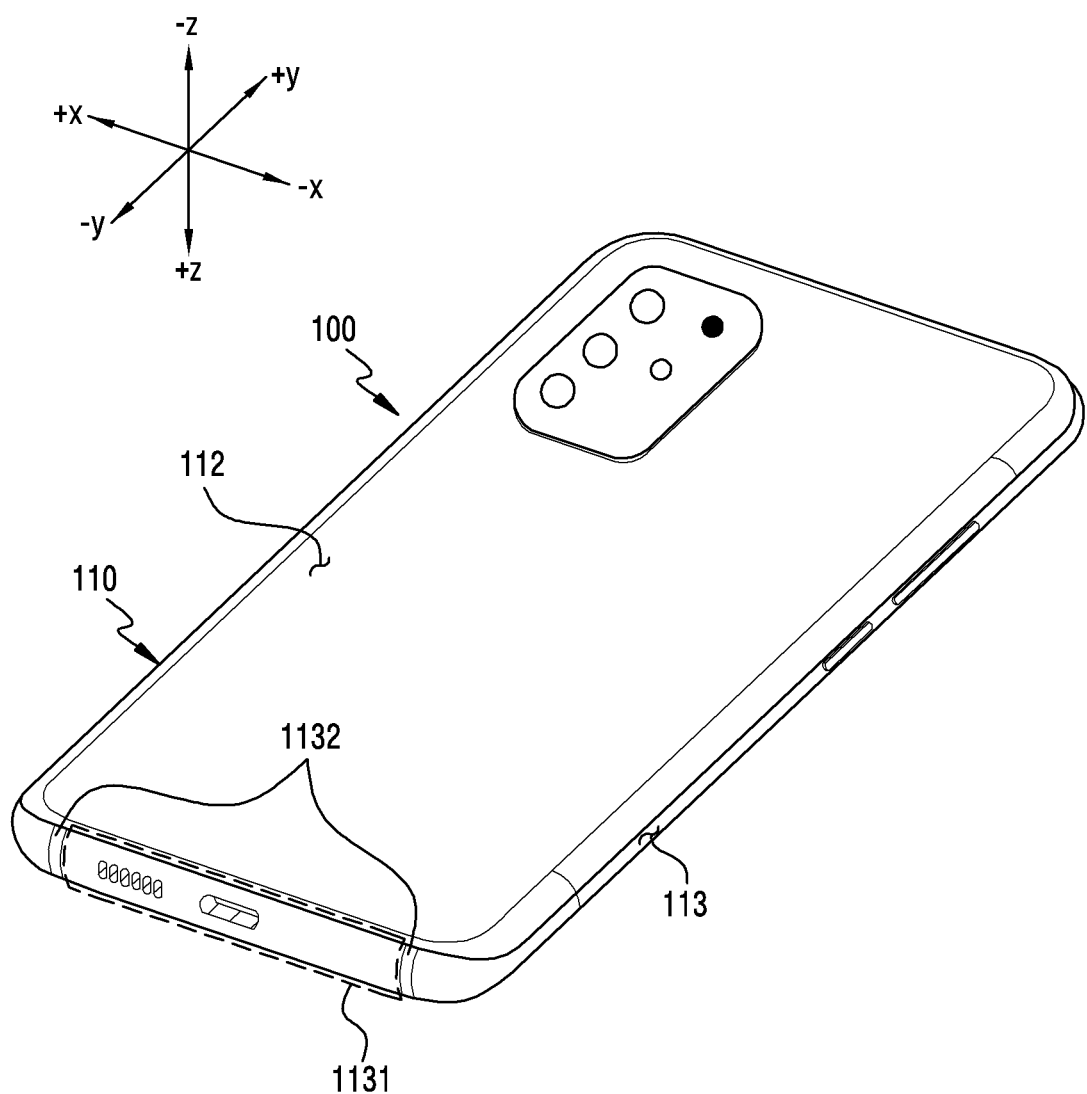
FIG. 1B illustrates a rear face of the electronic device according to an embodiment of the disclosure.

FIG. 1B illustrates a rear face of the electronic device 100 according to an embodiment of the disclosure.

Referring to FIGS. 1A and 1B, the electronic device 100 according to an embodiment may include a housing 110 including a rear plate 112, a display 120 disposed to the front face of the electronic device 100, and a side member 113 surrounding a space between the display 120 and the rear plate 112.

In an embodiment, the display 120 may occupy most of the front face of the electronic device 100. For example, the display 120 may be disposed to the front face of the electronic device 100.

According to an embodiment, the rear plate 112 may be constructed of coated or colored glass, ceramic, polymer, metallic materials (e.g. aluminum, stainless steel (STS), or magnesium) or a combination of at least two of these materials. According to an embodiment, the rear plate 112 may include a curved portion seamlessly extending by being bent from at least one end toward the side member 113.

According to an embodiment, the side member 113 may be bonded to the rear plate 112 and may include metal and/or polymer. According to an embodiment, the rear plate 112 and the side member 113 may be constructed integrally and may include the same material (e.g., a metallic material such as aluminum).

According to an embodiment, a conductive portion of the side member 113 may be electrically coupled to a wireless communication circuit to operate as an antenna radiator for transmitting and/or receiving a radio frequency (RF) signal of a designated frequency band. According to an embodiment, the wireless communication circuit may transmit an RF signal of a designated frequency band to the conductive portion of the side member 113, or may receive the RF signal of the designated frequency band from the conductive portion.

Referring to FIGS. 1A and 1B, in an embodiment, at least part of the side member 113 constituting a side face of the housing 110 may include a conductive portion. In an embodiment, the conductive portion may be located at a first portion 1131 corresponding to a terminal end portion when viewed from the housing 110 in a −y direction.

In an embodiment, a segmented portion 1132 may be disposed to at least one end portion of the first portion 1131 corresponding to the terminal end portion when viewed from the housing 110 in the −y direction.

According to an embodiment, the segmented portion 1132 disposed to at least one end portion of the first portion 1131 may include an insulating material. The insulating material may be constructed of ceramic, plastic, resin, or a combination of at least two of these materials.

The electronic device 100 illustrated in FIGS. 1A and 1B corresponds to only one example, and does not limit a shape of a device to which the technical idea disclosed in the disclosure is applied. For example, the technical idea disclosed in the disclosure is applicable to various user devices including a portion which is operable as an antenna radiator. For example, the technical idea disclosed in the disclosure is applicable to a foldable electronic device, tablet, or laptop which is foldable horizontally or vertically by adopting a flexible display and a hinge structure.

Hereinafter, various embodiments are described, for convenience of explanation, based on the electronic device 101 of FIG. 3.

Figure 2:
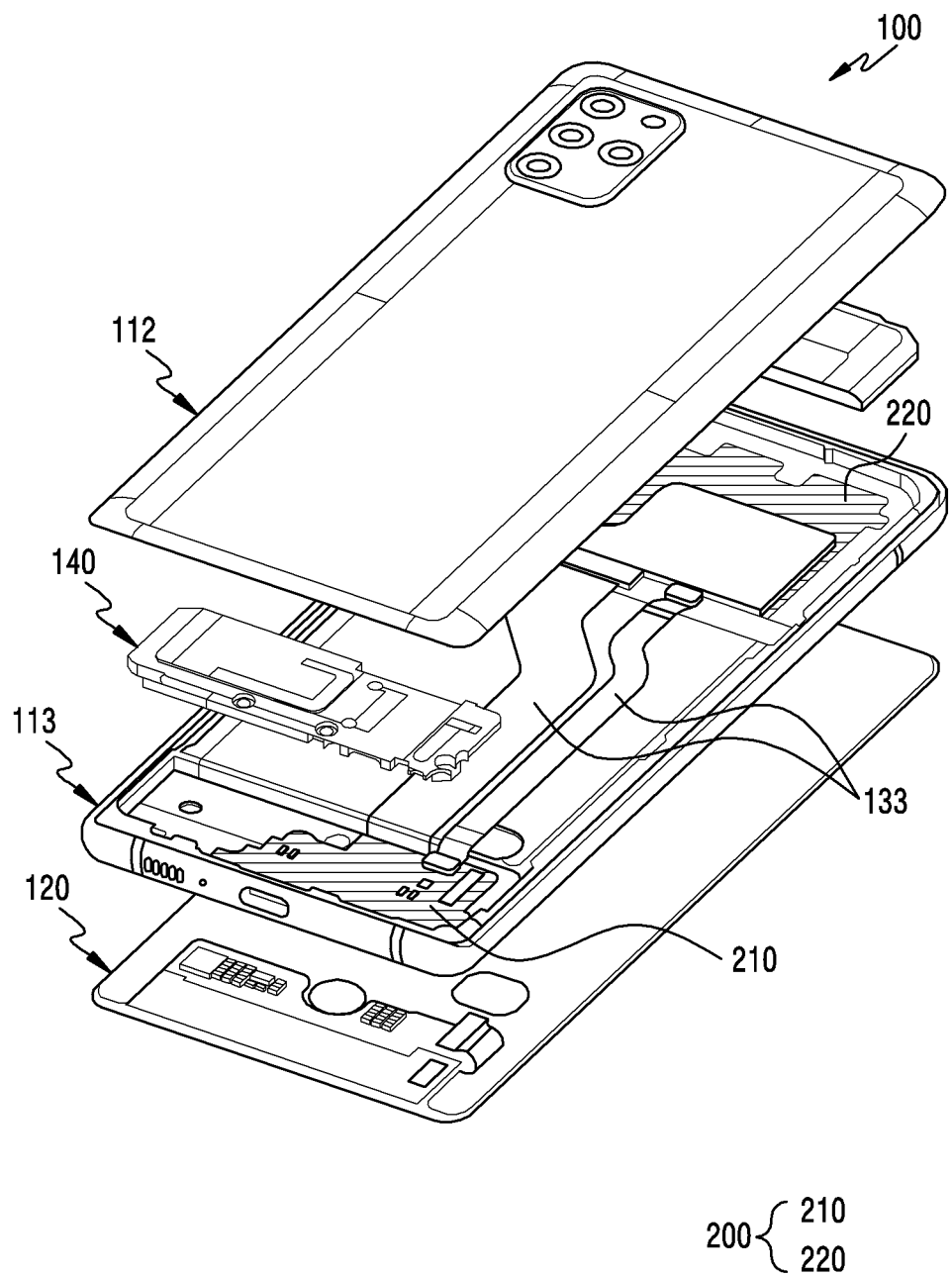
FIG. 2 is an exploded perspective view of the electronic device according to an embodiment of the disclosure.

FIG. 2 is an exploded perspective view of the electronic device 100 according to an embodiment of the disclosure.

Referring to FIG. 2, the electronic device 100 according to an embodiment may include the rear plate 112, a carrier 140, at least one printed circuit board 200, the side member 113, or the display 120. The electronic device 100 according to an embodiment may omit at least one of the aforementioned components, or may additionally include other components.

According to an embodiment, the rear plate 112 may constitute at least part of a rear face of the electronic device 100. The rear plate 112 may protect the electronic device 100 from an external impact or a foreign material.

According to an embodiment, the carrier 140 may be disposed between the rear plate 112 and the display 120. According to an embodiment, at least one antenna may be located in the carrier 140. According to an embodiment, the carrier 140 may be constructed of a non-conductive material.

According to an embodiment, a plurality of electronic components may be disposed to the at least one printed circuit board 200. In an embodiment, a processor, a memory, and/or an interface may be disposed to the at least one printed circuit board 200.

According to an embodiment, the at least one printed circuit board 200 may include a first printed circuit board 210 and a second printed circuit board 220 coupled to the first printed circuit board 210 through the electrical coupling member 133. However, the printed circuit board 200 of the disclosure is not limited to the aforementioned embodiment, and the printed circuit board 200 may be constructed as one substrate in another embodiment.

According to an embodiment, the display 120 may emit light from a pixel to transfer information to a user, and the light emitted from the pixel may be transferred to the outside of the electronic device 100 through the display 120. In an embodiment, the display 120 may include a protective layer such as tempered glass. In this case, the display 120 may constitute at least part of a front face of the electronic device 100.

According to an embodiment, the side member 113 may constitute a side face of the electronic device 100. As another example, the side member 113 may correspond to a portion of the housing 110, constituting the side face of the electronic device 100.

According to an embodiment, the side member 113 may include at least one conductive portion and at least one insulating portion. For example, an antenna may be constructed in at least one conductive portion (e.g., the first portion 1131 of FIGS. 1A and 1B) by using at least one insulating portion. According to an embodiment, the at least one conductive portion may be constructed of a conductive material (e.g., metal). The at least one insulating portion may be constructed of polymer (e.g., polycarbonate).

According to an embodiment, at least part of the conductive portion may be electrically coupled to a wireless communication circuit to operate as an antenna radiator for transmitting and/or receiving an RF signal of a designated frequency band.

Figure 3:
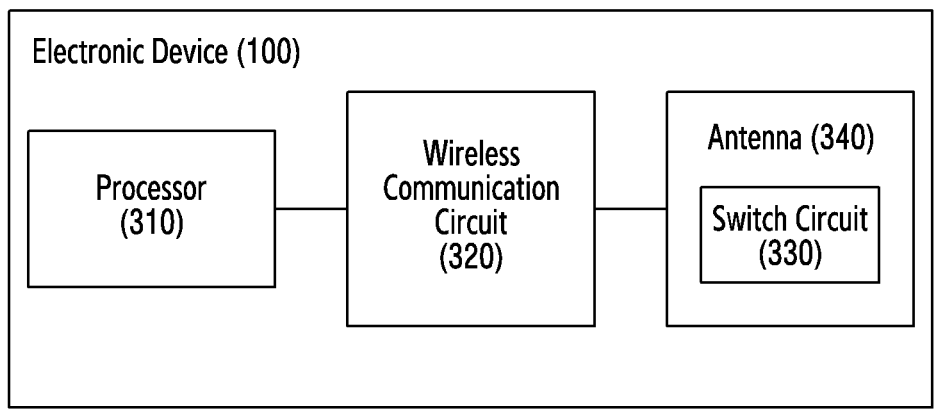
FIG. 3 is a brief block diagram of the electronic device according to an embodiment of the disclosure.

FIG. 3 is a brief block diagram of the electronic device 100 according to an embodiment of the disclosure.

Figure 14:
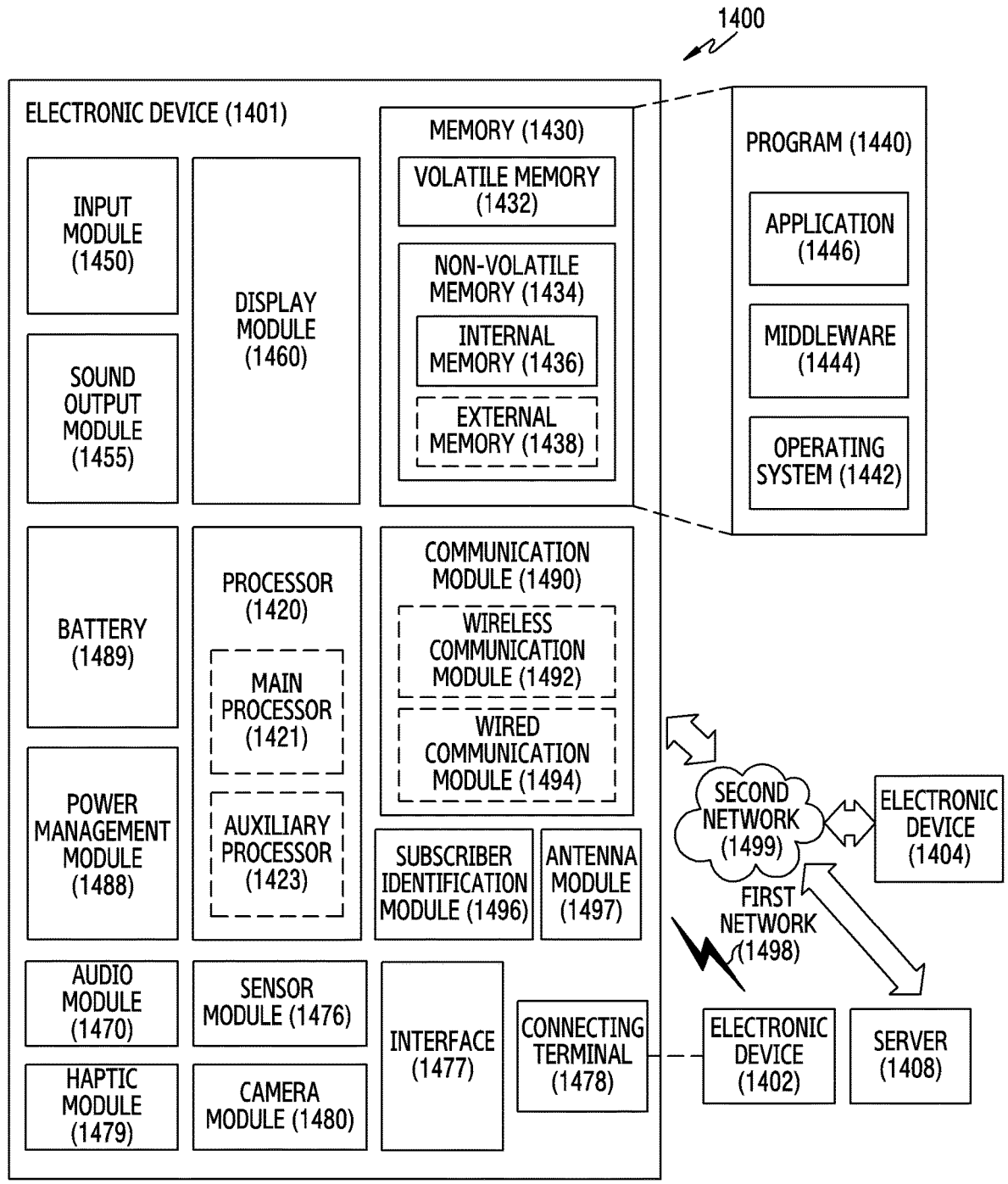
FIG. 14 is a block diagram of an electronic device in a network environment according to an embodiment of the disclosure.

The electronic device 100 according to an embodiment may include at least one of components of FIG. 14, in addition to the structure of FIG. 3.

Referring to FIG. 3, the electronic device 100 according to an embodiment may include a processor 310, a wireless communication circuit 320, and an antenna 340.

In an embodiment, the antenna 340 may include a switch circuit 330.

In an embodiment, the processor 310 may control the wireless communication circuit 320 to supply power to one point of a radiator included in the antenna 340 through a specific feeding path. For example, the wireless communication circuit 320 may supply power to one point of the first portion 1131 of the housing 110 of FIG. 1A, operating as the radiator of the antenna 340.

In an embodiment, the processor 310 may control the switch circuit 330 to transition from a first state of transmitting and/or receiving a first RF signal of a first frequency band to a second state of transmitting and/or receiving a second RF signal of a second frequency band.

In an embodiment, the processor 310 may control one or more antenna elements or antenna components for tuning a frequency of the antenna 340 and/or for modifying an impedance of the antenna 340.

In an embodiment, the switch circuit 330 may control opening or closing of a plurality of ports coupled to elements in the switch circuit 330 so that a resonance is achieved at different frequency bands. For example, the elements may include an inductor or a capacitor.

In an embodiment, the switch circuit 330 may be implemented as a switch circuit such as a double pole multi through (DPMT).

In an embodiment, the antenna 340 may include various types of antenna structures. For example, the antenna 340 may include a patch antenna, a dipole antenna, a monopole antenna, a slot antenna, a loop antenna, an inverted-F antenna, a planar inverted-F antenna, and/or an antenna structure in which any two or more of these antennas are combined.

Figure 4A:
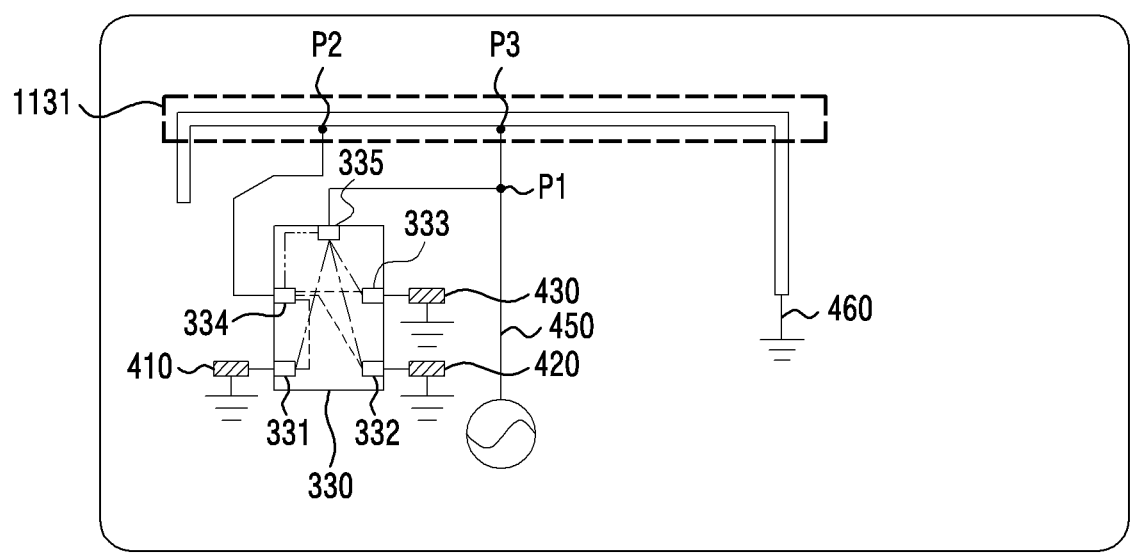
FIG. 4A is a conceptual diagram of hybrid antenna switching for selectively implementing a first switching scheme, a second switching scheme, or a third switching scheme according to an embodiment of the disclosure.

FIG. 4A is a conceptual diagram of hybrid antenna switching for selectively implementing a first switching scheme, a second switching scheme, or a third switching scheme according to an embodiment of the disclosure.

Figure 4B:
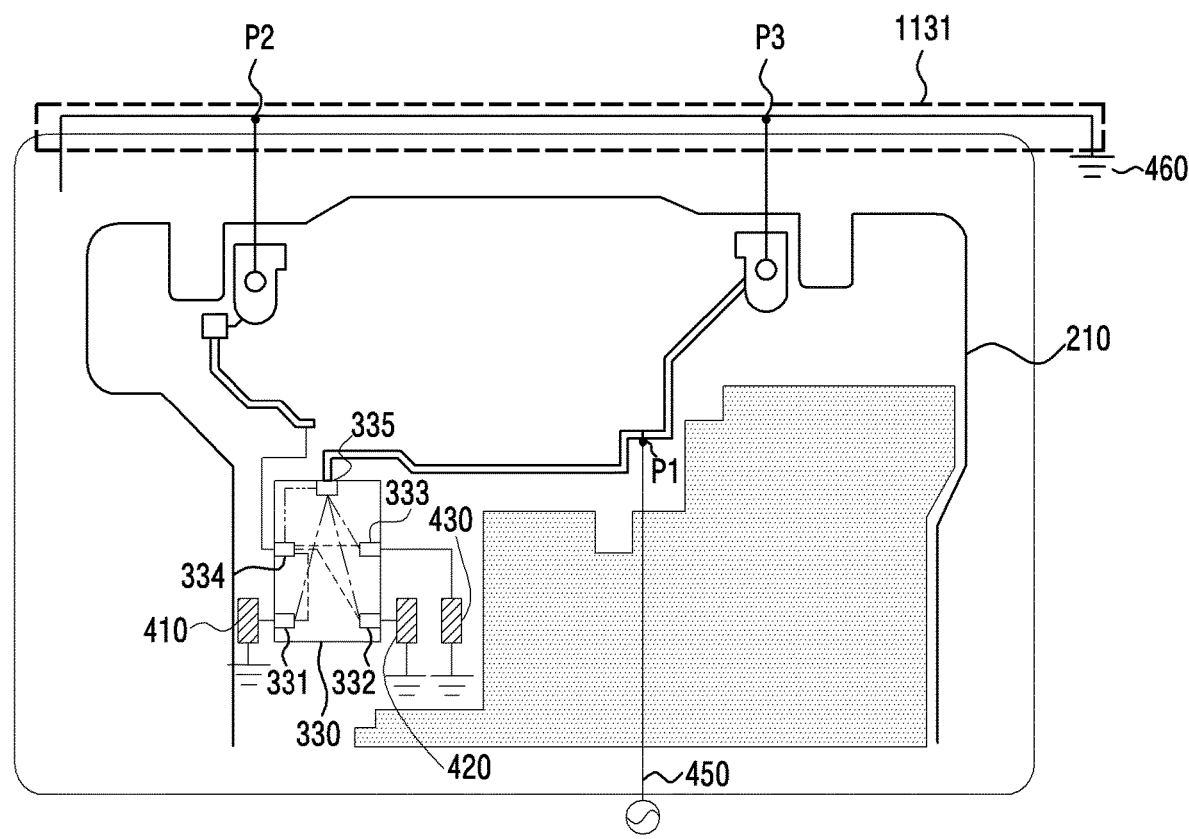
FIG. 4B is an internal circuit diagram of hybrid switching for selectively implementing the first switching scheme, the second switching scheme, or the third switching scheme according to an embodiment of the disclosure.

FIG. 4B is an internal circuit diagram of hybrid switching for selectively implementing the first switching scheme, the second switching scheme, or the third switching scheme according to an embodiment of the disclosure.

FIGS. 4A and 4B illustrate at least part of an antenna (e.g., the antenna 340 of FIG. 3) included in an electronic device (e.g., the electronic device 100 of FIG. 3).

Referring to FIG. 4A, in an embodiment, the electronic device (e.g., the electronic device 100 of FIG. 3) may include the switch circuit 330, the first portion 1131 of the housing 110, and a feeding path 450 from a wireless communication circuit (e.g., the wireless communication circuit 320 of FIG. 3), a ground 460, a first lumped element 410, a second lumped element 420, and/or a third lumped element 430. The switch circuit 330 may include a first port 331, a second port 332, a third port 333, a fourth port 334, and/or a fifth port 335.

According to an embodiment, the fifth port 335 in the switch circuit 330 may be electrically coupled to the feeding path 450 at a first point P1. According to an operation of the switch circuit 330, the feeding path 450 may be selectively coupled to at least one of the first port 331, the second port 332, and the third port 333. As another example, the feeding path 450 may not be coupled to the first port 331, the second port 332, or the third port 333. As another example, in a state of being coupled to one of the first port 331, the second port 332, and the third port 333 according to the operation of the switch circuit 330, the feeding path 450 may be selectively coupled to the fourth port 334 according to the operation of the switch circuit 330. For example, the feeding path 450 is electrically coupled to the fifth port 335. The fourth port 334 is coupled to the fifth port 335. The fifth port 335 is coupled to one of the first port 331, the second port 332, and the third port 333. Therefore, the feeding path 450 may be electrically coupled to one of the first port 331, the second port 332, and the third port 333.

Referring to FIG. 4B, in an embodiment, the switch circuit 330 may be disposed to the first printed circuit board 210 included in the electronic device 100. For example, comparing with FIG. 4A, FIG. 4B illustrates an example in which the switch circuit 330 and wiring of FIG. 4A are constructed on the first printed circuit board 210. The same/similar reference numerals have been used for the same or substantially the same components as those described above, and redundant descriptions will be omitted.

In another embodiment, the first printed circuit board 210 of the electronic device 100 may be replaced with the second printed circuit board 220 of FIG. 2.

According to an embodiment, the first printed circuit board 210 may include a plurality of layers, and the ground 460 may be constructed on at least one of the plurality of layers.

Components illustrated in FIGS. 4A and 4B are for exemplary purposes, and the electronic device 100 may further include an additional component. For example, the electronic device 100 may further include at least one of components illustrated in FIG. 14.

Referring to FIGS. 4A and 4B, in an embodiment, the first lumped element 410, the second lumped element 420, the third lumped element 430, and/or one end of the first portion 1131 of the housing 110 may be coupled to the ground 460. The fourth port 334 may be coupled at a second point P2 of the first portion 1131. The switch circuit 330 may be coupled at the first point P1 to the feeding path 450 electrically coupled to a wireless communication circuit (e.g., the wireless communication circuit 320 of FIG. 3).

In an embodiment, the fourth port 334 may be electrically coupled to at least one of the first port 331, the second port 332, and the third port 333. For example, the fourth port 334 may be electrically coupled to the ground 460 through at least one of the first port 331, the second port 332, and the third port 333. In an embodiment, the fourth port 334 may be electrically coupled to the second point P2 of the first portion 1131. In an embodiment, the feeding path 450 may be electrically coupled to a third point P3 of the first portion 1131.

In an embodiment, the lumped elements 410, 420, and 430 may include a resistor, a capacitor, an inductor, or a combination thereof.

In an embodiment, the first lumped element 410 may be disposed outside the switch circuit 330, and may be coupled to the first port 331. For example, one end of the first lumped element 410 may be coupled to the ground 460, and the other end of the first lumped element 410 may be electrically coupled to the first port 331 of the switch circuit 330.

In another embodiment, the first lumped element 410 may be disposed inside the switch circuit 330, and may be coupled to the first port 331. For example, one end of the first port 331 may be coupled to the ground 460, and the other end of the first port 331 may be coupled to the first lumped element 410 disposed inside the switch circuit 330.

In an embodiment, the second lumped element 420 may be disposed outside the switch circuit 330, and may be coupled to the second port 332. For example, the second lumped element 420 may be coupled to the ground 460, and the other end of the second lumped element 420 may be electrically coupled to the second port 332 of the switch circuit 330.

In another embodiment, the second lumped element 420 may be disposed inside the switch circuit 330, and may be coupled to the second port 332. For example, one end of the second port 332 may be coupled to the ground 460, and the other end of the second port 332 may be coupled to the second lumped element 420 disposed inside the switch circuit 330.

In an embodiment, the third lumped element 430 may be disposed outside the switch circuit 330, and may be coupled to the third port 333. For example, the third lumped element 430 may be coupled to the ground 460, and the other end of the third lumped element 430 may be electrically coupled to the third port 333 of the switch circuit 330.

In another embodiment, the third lumped element 430 may be disposed inside the switch circuit 330, and may be coupled to the third port 333. For example, one end of the third port 333 may be coupled to the ground 460, and the other end of the third port 333 may be coupled to the third lumped element 430 disposed inside the switch circuit 330.

In an embodiment, the ground 460 may be included in a conductive layer in a printed circuit board (e.g., the printed circuit board 200 of FIG. 2). In an embodiment, the ground 460 may include a conductive material such as metal. For example, the ground 460 may be a conductive plate.

In an embodiment, the first lumped element 410 may include an inductor having a value of 33 nH approximately. The second lumped element 420 may include an inductor having a value of 10 nH approximately. The third lumped element 430 may include an inductor having a value of 4.7 nH approximately.

In an embodiment, the first lumped element 410, the second lumped element 420, and/or the third lumped element 430 may include a variable lumped element. For example, when the variable lumped element is an inductive (L-type) inductor, the variable lumped element is an extension coil, and when the variable lumped element is a capacitive (C-type) capacitor, the variable lumped element may act as a loading capacitor.

In an embodiment, a reactance value set may be configured for at least one lumped element among the first lumped element 410, the second lumped element 420, and/or the third lumped element 430, so that an input impedance of an antenna (e.g., the antenna 340 of FIG. 3) does not change.

In an embodiment, the switch circuit 330 may include a lumped element constructed of an inductor having an inductance value internally designated, a capacitor having a designated capacitor, or a combination thereof.

Figure 5A:
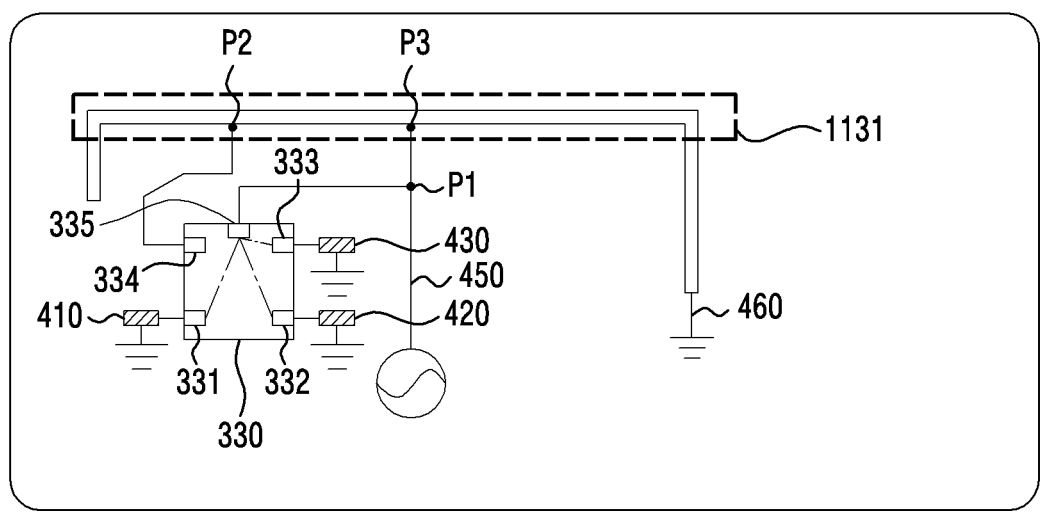
FIG. 5A illustrates a conceptual diagram of the first switching scheme of the hybrid antenna switching scheme according to an embodiment of the disclosure.

FIG. 5A illustrates a conceptual diagram of the first switching scheme of the hybrid antenna switching scheme according to an embodiment of the disclosure.

Figure 5B:
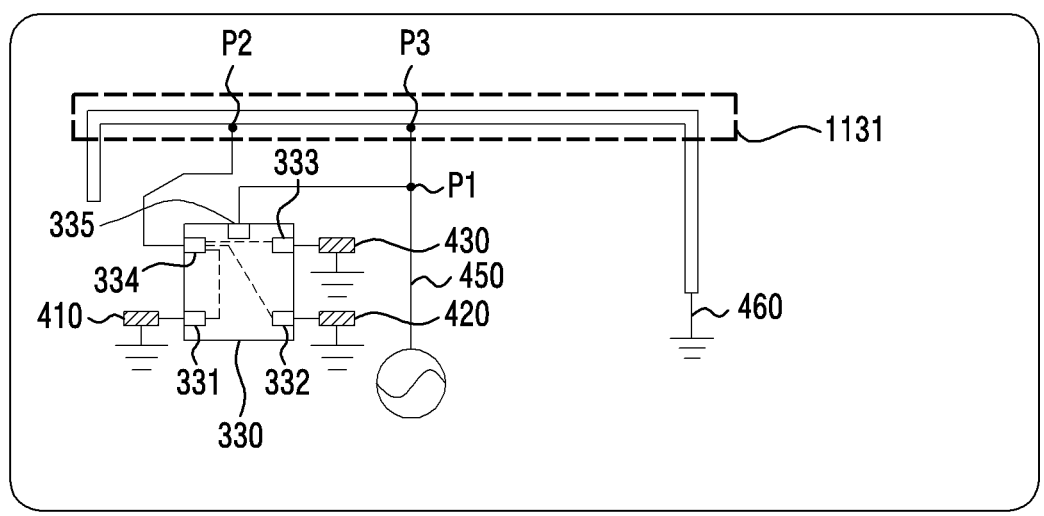
FIG. 5B illustrates a conceptual diagram of the second switching scheme of the hybrid antenna switching scheme according to an embodiment of the disclosure.

FIG. 5B illustrates a conceptual diagram of the second switching scheme of the hybrid antenna switching scheme according to an embodiment of the disclosure.

Figure 5C:
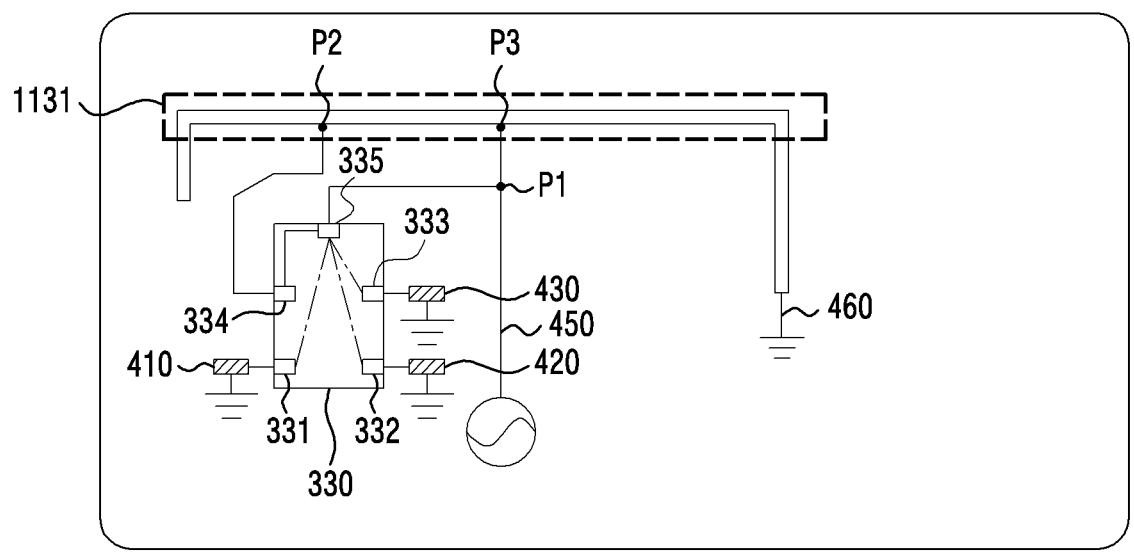
FIG. 5C illustrates a conceptual diagram of the third switching scheme of the hybrid antenna switching scheme according to an embodiment of the disclosure.

FIG. 5C illustrates a conceptual diagram of the third switching scheme of the hybrid antenna switching scheme according to an embodiment of the disclosure.

Referring to FIGS. 5A, 5B, and 5C, the same/similar reference numerals have been used for the same or substantially the same components as those described above, and redundant descriptions will be omitted.

According to an embodiment, the antenna switching scheme may vary depending on an electrical coupling relation of the fourth port 334 with respect to the first port 331, the second port 332, and the third port 333. For example, the switch circuit 330 may operate using the first switching scheme in which the fourth port 334 is open and the fifth port 335 is electrically coupled selectively to at least any one of the first port 331, the second port 332, and the third port 333. As another example, the switch circuit 330 may operate using the second switching scheme in which the fifth port 335 is open and the fourth port 334 is electrically coupled selectively to at least one of the first port 331, the second port 332, and the third port 333. As another example, the switch circuit 330 may operate using the third switching scheme in which the fourth port 334 is electrically coupled to the second point P2 of the first portion 1131 and is coupled to the fifth port 335, and the fifth port 335 is electrically coupled selectively to at least any one of the first port 331, the second port 332, and the third port 333.

Referring to FIG. 5A, in an embodiment, at least one processor (e.g., the processor 310 of FIG. 3) may be operatively coupled to the switch circuit 330 and a wireless communication circuit (e.g., the wireless communication circuit 320 of FIG. 3). The wireless communication circuit controlled by at least one processor may be used to prevent the fifth port 335 electrically coupled to at least one of the first port 331, the second port 332, and the third port 333 from being electrically coupled to the fourth port 334, so that the switch circuit 330 is operable using the first switching scheme. For example, the switch circuit 330 operating using the first switching scheme may control an impendence related to transmission and/or reception of a signal of a first frequency band.

Referring to FIG. 5B, at least one processor may be operatively coupled to the switch circuit 330 and the wireless communication circuit. The wireless communication circuit controlled by at least one processor may be used to open the fifth port 335 and to couple at least one of the first port 331, the second port 332, and the third port 333 selectively to the fourth port 334, so that the switch circuit 330 is operable using the second switching scheme. For example, the switch circuit 330 operating using the second switching scheme may efficiently transmit and/or receive a signal of a second frequency band different from the first frequency band.

Referring to FIG. 5C, in an embodiment, the at least one processor may be operatively coupled to the switch circuit 330 and the wireless communication circuit. The wireless communication circuit controlled by at least one processor may be used to electrically couple the at least one of the first port 331, the second port 332, and the third port 333 to the fifth port 335 and to couple the fourth port 334 to the fifth port 335, so that the switch circuit 330 is operable using the third switching scheme.

According to an embodiment, there may be an advantage of supplying power to the point P2 at which the fourth port 334 and the first portion 1131 are coupled.

Figure 6A:
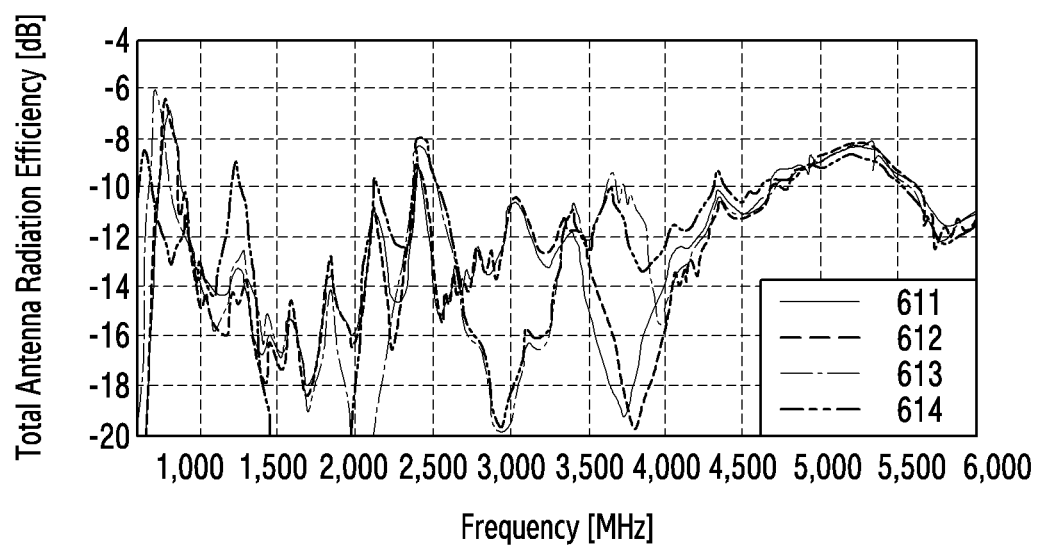
FIG. 6A illustrates a radiation feature based on the first switching scheme according to an embodiment of the disclosure.

FIG. 6A illustrates a radiation feature based on the first switching scheme according to an embodiment of the disclosure.

Figure 6B:
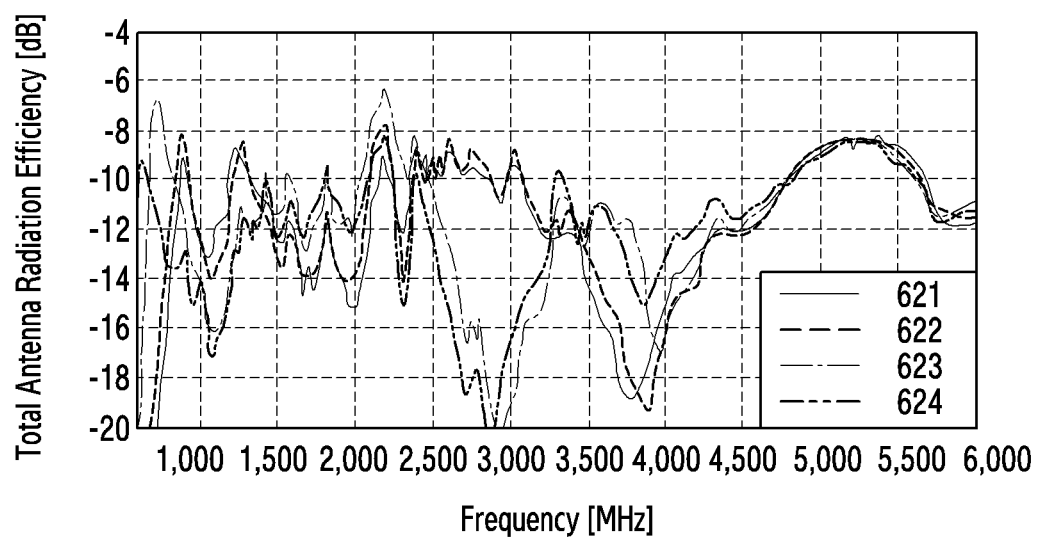
FIG. 6B illustrates a radiation feature based on the third switching scheme according to an embodiment of the disclosure.

FIG. 6B illustrates a radiation feature based on the third switching scheme according to an embodiment of the disclosure.

Figure 6C:
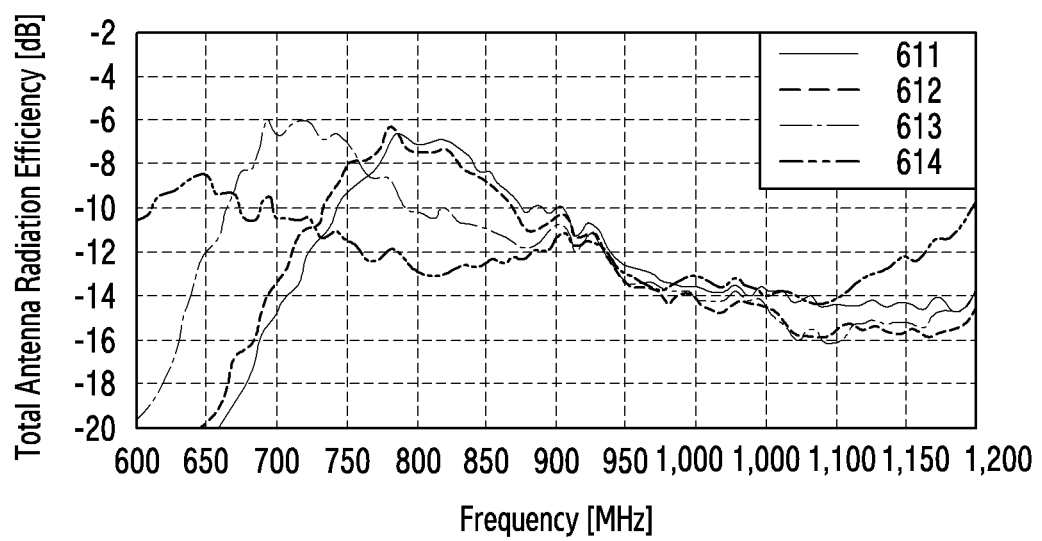
FIG. 6C illustrates a radiation feature of a frequency band of 600 to 1200 MHz based on the first switching scheme according to an embodiment of the disclosure.

FIG. 6C illustrates a radiation feature of a frequency band of 600 to 1200 MHz based on the first switching scheme according to an embodiment of the disclosure.

Figure 6D:
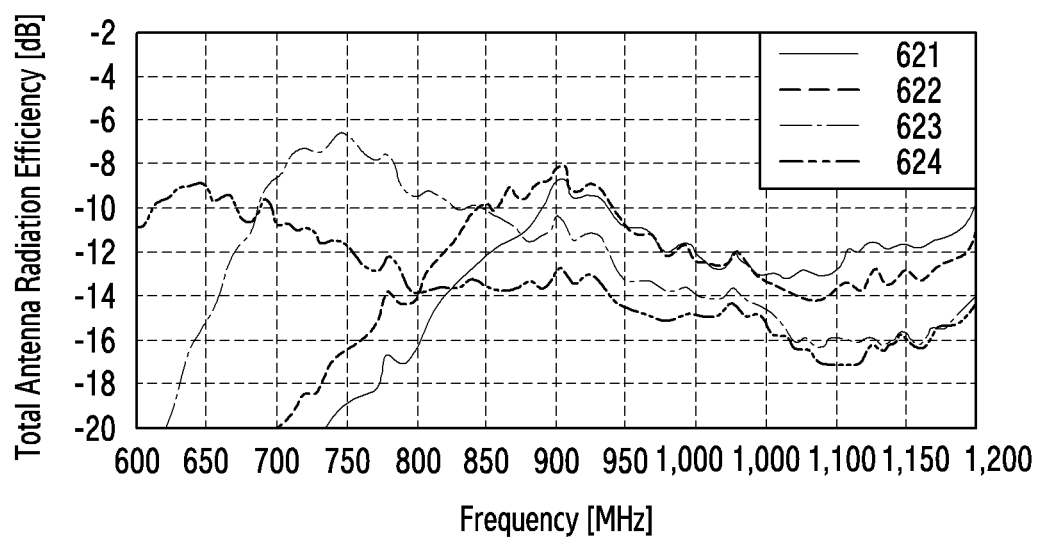
FIG. 6D illustrates a radiation feature of a frequency band of 600 to 1200 MHz based on the third switching scheme according to an embodiment of the disclosure.

FIG. 6D illustrates a radiation feature of a frequency band of 600 to 1200 MHz based on the third switching scheme according to an embodiment of the disclosure.

Referring to FIG. 6A, a graph 611 illustrates an antenna radiation efficiency when a second port (e.g., the second port 332 of FIG. 5A) and a third port (e.g., the third port 333 of FIG. 5A) are coupled to a fifth port (e.g., the fifth port 335 of FIG. 5A) in a switch circuit (e.g., the switch circuit 330 of FIG. 5A) to be coupled to a feeding path (e.g., the feeding path 450 of FIG. 5A). A graph 612 illustrates an antenna radiation efficiency when the third port 333 is coupled to the fifth port 335 of the switch circuit 330 to be coupled to the feeding path 450. A graph 613 illustrates an antenna radiation efficiency when the second port 332 is coupled to the fifth port 335 in the switch circuit 330 to be coupled to the feeding path 450. A graph 614 illustrates an antenna radiation efficiency when the first port (e.g., the first port 331 of FIG. 5A) is coupled to the fifth port 335 of the switch circuit 330 to be coupled to the feeding path 450. The graphs 611, 612, 613, and 614 are antenna efficiency graphs when a fourth port (e.g., the fourth port 334 of FIG. 5A) is not electrically coupled to the first port 331, the second port 332, and the third port 333, and the fifth port 335 is coupled to at least one of the first port 331, the second port 332, and the third port 333, so that the switch circuit 330 operates using the first switching scheme. Referring to FIG. 6A, a radiation efficiency of an antenna (e.g., the antenna 340 of FIG. 3) is improved, but a radiation shift range of the antenna may be narrow.

Referring to FIG. 6B, a graph 621 illustrates an antenna radiation efficiency when the second port 332 and the third port 333 are coupled to the fifth port 335, and the fifth port 335 is coupled to the fourth port 334. A graph 622 illustrates an antenna radiation efficiency when the third port 333 is coupled to the fifth port 335, and the fifth port 335 is coupled to the fourth port 334. A graph 623 illustrates an antenna radiation efficiency when the second port 332 is coupled to the fifth port 335, and the fifth port 335 is coupled to the fourth port 334. A graph 624 illustrates an antenna radiation efficiency when the first port 331 is coupled to the fifth port 335, and the fifth port 335 is coupled to the fourth port 334. The graphs 621, 622, 623, and 624 are antenna efficiency graphs when the fourth port 334 is electrically coupled to the fifth port 335, and the fifth port 335 is coupled to at least one of the first port 331, the second port 332, and the third port 333, so that the switch circuit 330 operates using the third switching scheme. Referring to FIG. 6B, in case of the third switching scheme in which the first switching scheme and the second switching scheme are combined, performance may be improved at a band of 900 MHz approximately since an antenna switching range is increased although an antenna efficiency is slightly decreased.

Referring to FIG. 6C, regarding a low-frequency band, at 600 to 1200 MHz approximately, the graph 611, the graph 612, or the graph 613 shows that the antenna has a high radiation efficiency of −7 dB, −7 dB, and −6 dB approximately in that order at 700 to 800 MHz. The graph 614 shows that the antenna has a high radiation efficiency of −9 dB approximately at 650 MHz.

Referring to FIG. 6D, regarding a low-frequency band, at 600 to 1200 MHz approximately, the graph 621 and the graph 622 show that the antenna has a high radiation efficiency of −9 dB and −8 dB approximately in that order at 900 MHz. The graph 623 and the graph 624 show that the antenna has a high radiation efficiency of −7 dB and −9 dB approximately in that order at 750 MHz and 650 MHz.

Referring to FIGS. 6C and 6D, antenna center frequencies represented in the graphs 611 and 612 are located at 750 to 800 MHz, but antenna center frequencies represented in the graphs 621 and 622 are located at a band around 900 MHz. It can be seen that a center frequency band is shifted from 750 to 800 MHz to the band around 900 MHz since a switch circuit (e.g., the switch circuit 330 of FIG. 5A) is changed from the first switching scheme to the third switching scheme.

In an embodiment, an antenna radiation efficiency at a center frequency represented in the graph 623 is −9 dB approximately, and an antenna radiation efficiency at a center frequency represented in the graph 613 is −6 dB approximately. Antenna radiation efficiencies at center frequencies represented in the graphs 621 and 622 are respectively −9 dB and −8 dB approximately in that order, and antenna radiation efficiencies at center frequencies represented in the graphs 611 and 612 are respectively −7 dB and −7 dB approximately in that order. Therefore, it can be seen that an antenna radiation efficiency at a center frequency band is improved by 1 to 3 dB approximately since the switch circuit (e.g., the switch circuit 330 of FIG. 5A) is changed from the third switching scheme to the first switching scheme.

Figure 7A:
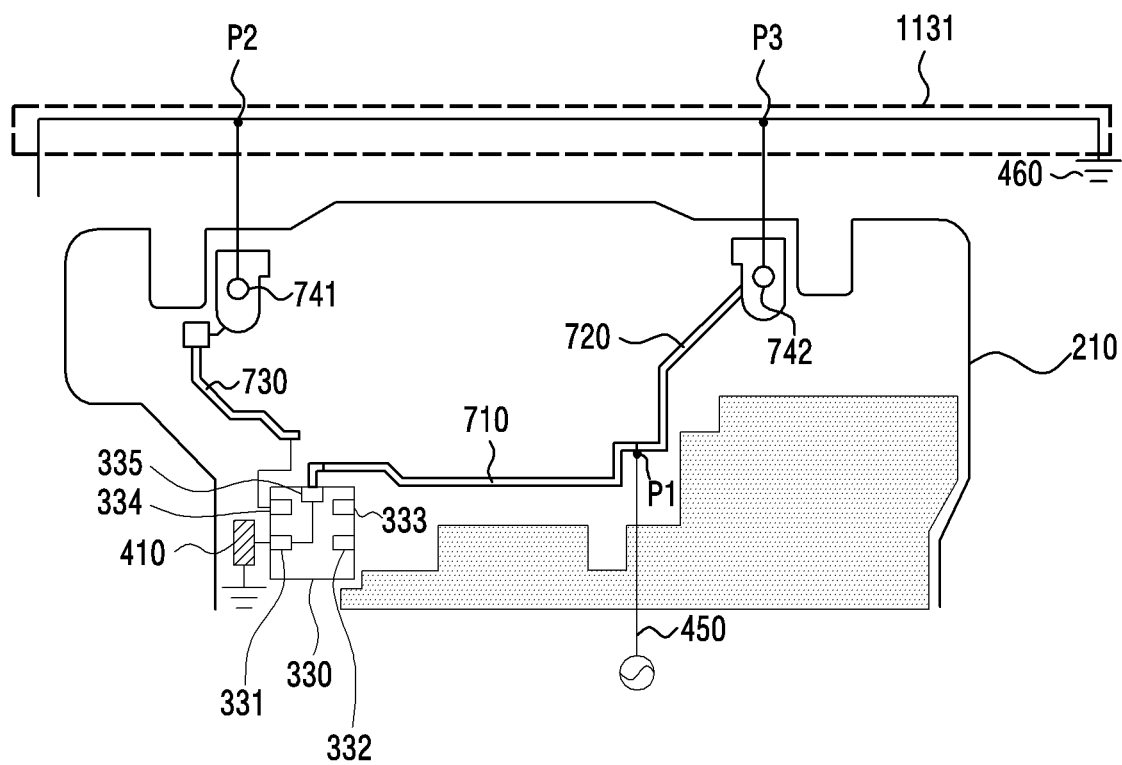
FIG. 7A is an internal circuit diagram of the first switching scheme utilizing a first port according to an embodiment of the disclosure.

FIG. 7A is an internal circuit diagram of the first switching scheme utilizing a first port according to an embodiment of the disclosure.

Figure 7B:
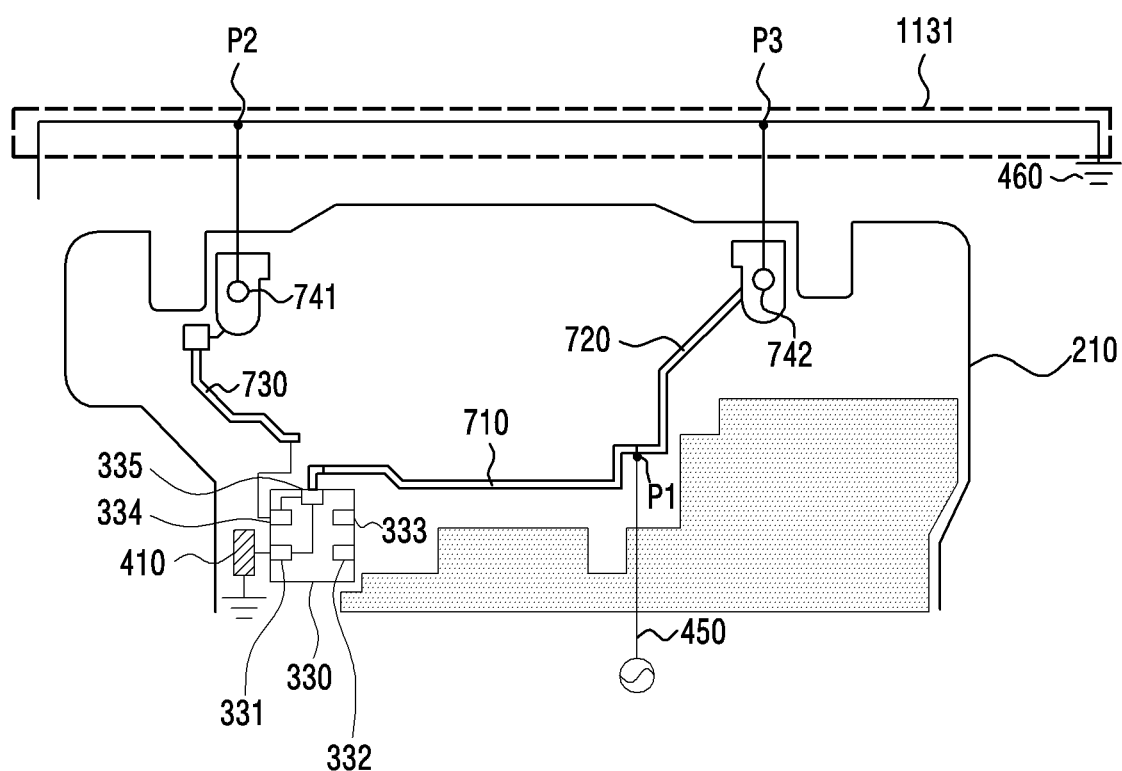
FIG. 7B is an internal circuit diagram of the third switching scheme utilizing the first port according to an embodiment of the disclosure.

FIG. 7B is an internal circuit diagram of the third switching scheme utilizing the first port according to an embodiment of the disclosure.

Referring to FIGS. 7A and 7B, the electronic device 100 according to an embodiment may include the first printed circuit board 210, the switch circuit 330, the first portion 1131, the feeding path 450 from a wireless communication circuit (e.g., the wireless communication circuit 320 of FIG. 3), the ground 460, and/or the first lumped element 410. The first printed circuit board 210 may include a first conductive trace 710, a second conductive trace 720, a third conductive trace 730, a first coupling member 741, and/or a second coupling member 742. In an embodiment, the switch circuit 330 may include the first port 331, the second port 332, the third port 333, the fourth port 334, and/or the fifth port 335.

In another embodiment, the first printed circuit board 210 of the electronic device 100 may be replaced with the second printed circuit board 220 of FIG. 2.

In an embodiment, the first coupling member 741 and/or the second coupling member 742 may be a flange and/or a C-clip.

Referring to FIGS. 7A and 7B, the first port 331 according to an embodiment may be coupled to the first lumped element 410. The second port 332 and the third port 333 may be open. The switch circuit 330 may be coupled to the feeding path 450 at the first point P1. The first conductive trace 710 may extend from the switch circuit 330 to the first point P1. The second conductive trace 720 may extend from the first point P1 to the second coupling member 742. The third conductive trace 730 may extend from the fourth port 334 to the first coupling member 741, In an embodiment, the switch circuit 330 and the first portion 1131 of the housing 110 may be electrically coupled by means of the first conductive trace 710, the second conductive trace 720, and/or the second coupling member 742.

In an embodiment, the feeding path 450 may include the second coupling member 742 or the second conductive trace 720.

In an embodiment, a wireless communication circuit (e.g., the wireless communication circuit 320 of FIG. 3) may supply power to the first portion 1131. For example, the wireless communication circuit may supply power to the third point P3 of the first portion 1131 through the second conductive trace 720 and the second coupling member 742, In an embodiment, the first conductive trace 710, the second conductive trace 720, and the third conductive trace 730 may include a conductive material such as a metal foil (e.g., copper or aluminum).

In an embodiment, an inductor (not shown) additionally coupled to the third conductive trace 730 may remove direct current (DC) current provided to the first portion 1131. For example, the inductor coupled to the third conductive trace 730 may be coupled to the ground 460, and may transfer to the ground 460 the DC current provided to the third conductive trace 730.

In an embodiment, the inductor additionally coupled to the third conductive trace 730 to remove the DC current may have an inductance value of 68 nH approximately.

In an embodiment, an electrical coupling relation of the switch circuit 330 may vary depending on the fourth port 334. For example, referring to FIG. 7A, the fourth port 334 may not be coupled to fifth port 335 coupled to the first port 331, and thus the first port 331 coupled to the fifth port 335 may not be electrically coupled to the fourth port 334. Accordingly, the switch circuit 330 may operate using the first switching scheme. As another example, referring to FIG. 7B, the fourth port 334 may be coupled to the fifth port 335, and thus the first port 331 coupled to the fifth port 335 may be electrically coupled to the fourth port 334. Accordingly, the switch circuit 330 may operate using the third switching scheme.

Referring to FIG. 7B, as an embodiment, the fourth port 334 may be coupled to the fifth port 335, and may be electrically coupled to the first port 331 coupled to the fifth port 335. As another embodiment, each of the fourth port 334 and the fifth port 335 may be directly coupled to the first port 331. In this case, the switch circuit 330 may operate selectively using the first switching scheme, the second switching scheme, or the third switching scheme. For example, when the fourth port 334 is open, and the fifth port 335 is coupled to the first port 331, the switch circuit 330 may operate using the first switching scheme. When the fourth port 334 is directly coupled to the first port 331, and the fifth port 335 is open, the switch circuit 330 may operate using the second switching scheme. When the fourth port 334 is directly coupled to the first port 331, and the fifth port 335 is directly coupled to the first port 331, the switch circuit 330 may operate using the third switching scheme.

Figure 8:
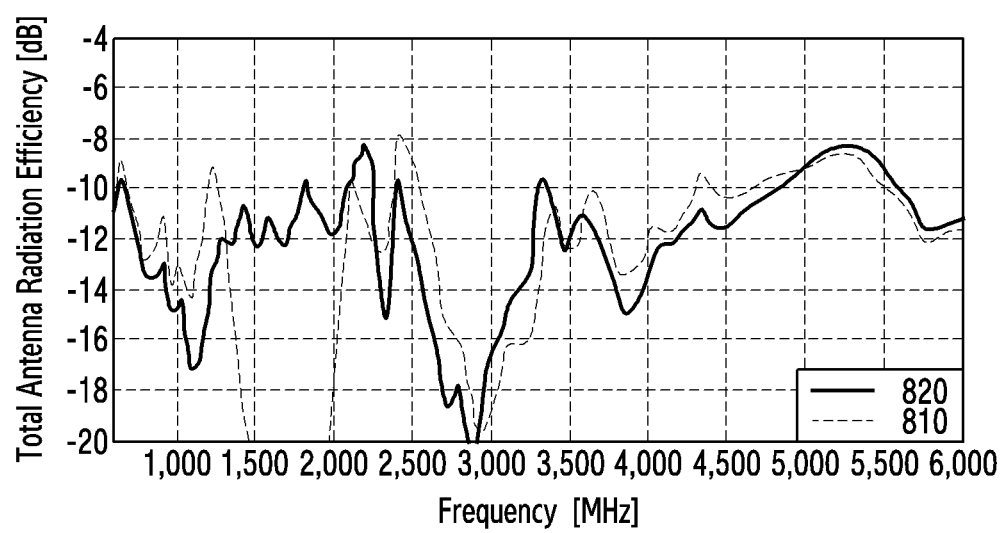
FIG. 8 illustrates a radiation feature of the first switching scheme and third switching scheme utilizing the first port according to an embodiment of the disclosure.

FIG. 8 illustrates a radiation feature of a first switching scheme and third switching scheme utilizing a first port according to an embodiment of the disclosure.

Referring to FIG. 8, an antenna radiation efficiency graph 810 of the first switching scheme and an antenna radiation efficiency graph 820 of the third switching scheme are illustrated. Hereinafter, the graphs are referred to as the first switching graph 810 and the third switching graph 820 in an orderly manner, and the antenna radiation may be interpreted to be the same as the radiation efficiency.

An antenna of the first switching graph 810 in a frequency band around 1500 to 2000 MHz approximately shows a low radiation efficiency, whereas an antenna of the third switching graph 820 shows an improved radiation efficiency of −11 dB approximately. This shows that the radiation efficiency may be improved at a specific frequency band with the construction of a new resonance path in a first portion (e.g., the first portion 1131 of FIGS. 4A and 4B) since the switching scheme is changed from the first switching scheme to the third switching scheme. An antenna of the first switching graph 810 in a frequency band of 1500 MHz or less approximately shows a relatively improved radiation efficiency of −10 to −14 dB approximately, whereas an antenna of the third switching graph 820 shows a relatively low radiation efficiency of −14 to −16 dB approximately. In addition, comparing the first switching graph 810 and the third switching graph 820 at a frequency band around 2500 MHz approximately, the first switching graph 810 shows a relatively high radiation efficiency. This is because an antenna radiation efficiency is improved since a switch circuit (e.g., the switch circuit 330 of FIG. 7B) is changed from the third switching scheme to the first switching scheme. Accordingly, it shows that the antenna radiation efficiency may be improved at a specific frequency band by using the first switching scheme.

Figure 9A:
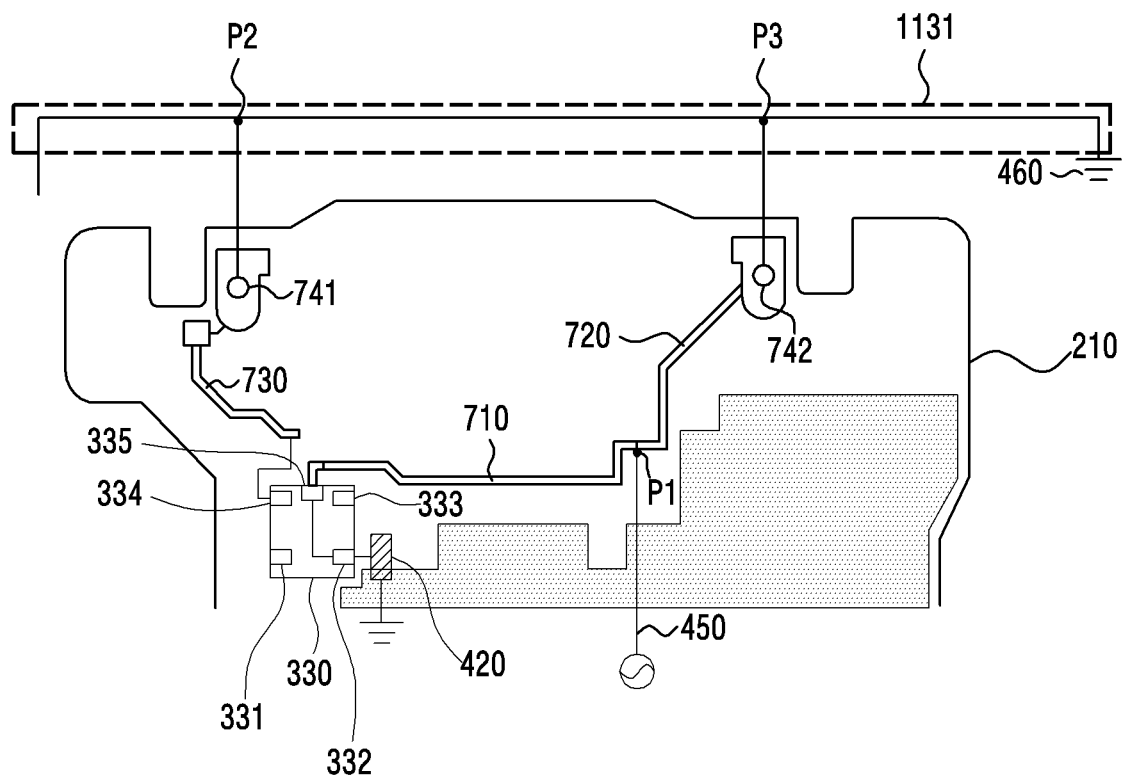
FIG. 9A is an internal circuit diagram of the first switching scheme utilizing a second port according to an embodiment of the disclosure.

FIG. 9A is an internal circuit diagram of the first switching scheme utilizing a second port according to an embodiment of the disclosure.

Figure 9B:
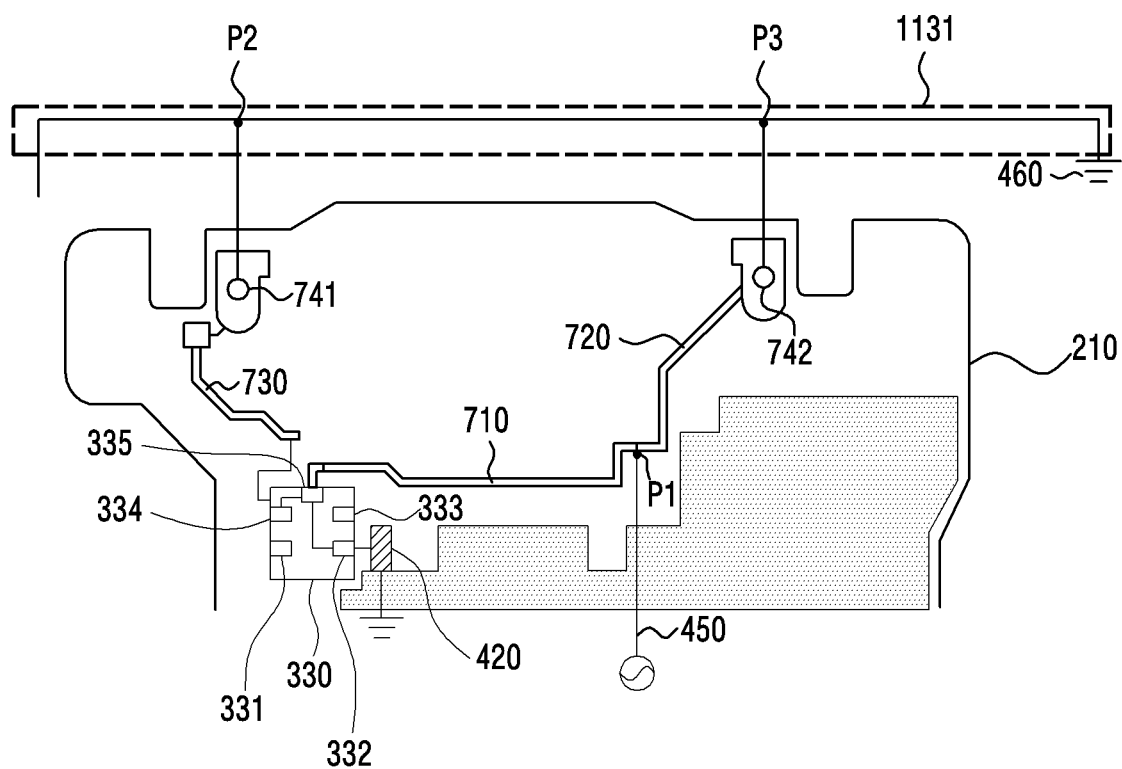
FIG. 9B is an internal circuit diagram of the third switching scheme utilizing the second port according to an embodiment of the disclosure.

FIG. 9B is an internal circuit diagram of the third switching scheme utilizing the second port according to an embodiment of the disclosure.

Referring to FIGS. 9A and 9B, the electronic device 100 according to an embodiment may include the second lumped element 420. The same/similar reference numerals have been used for the same or substantially the same components as those described above, and redundant descriptions will be omitted.

Referring to FIGS. 9A and 9B, the second port 332 according to an embodiment may be coupled to the second lumped element 420. The first port 331 and the third port 333 may be open. The switch circuit 330 may be coupled to the feeding path 450 at the first point P1. The first conductive trace 710 may extend from the switch circuit 330 to the first point P1. The second conductive trace 720 may extend from the first point P1 to the second coupling member 742. The third conductive trace 730 may extend from one end of the fourth port 334 to the first coupling member 741, In an embodiment, a wireless communication circuit (e.g., the wireless communication circuit 320 of FIG. 3) may supply power to the first portion 1131. For example, the wireless communication circuit may supply power to the third point P3 of the first portion 1131 through the second conductive trace 720 and the second coupling member 742, For example, the third point P3 may imply a point at which the first portion 1131 and the second coupling member 742 are coupled.

In an embodiment, the switch circuit 330 and the first portion 1131 of the housing 110 may be electrically coupled by means of the first conductive trace 710, the second conductive trace 720, and/or the second coupling member 724.

In an embodiment, the feeding path 450 may include the second coupling member 742 or the second conductive trace 720. In an embodiment, an electrical coupling relation may vary depending on the fourth port 334. For example, referring to FIG. 9A, the fourth port 334 may be open so that the fourth port 334 is not coupled to the fifth port 335, and thus the second port 332 coupled to the fifth port 335 may not be electrically coupled to the fourth port 334. Accordingly, the switch circuit 330 may operate using the first switching scheme. As another example, referring to FIG. 9B, when the fourth port 334 is coupled to the fifth port 335, the second port 332 coupled to the fifth port 335 may be electrically coupled to the fourth port 334. Accordingly, the switch circuit 330 may operate using the third switching scheme.

Referring to FIG. 9B, as an embodiment, the fourth port 334 may be coupled to the fifth port 335, and may be electrically coupled to the second port 332 coupled to the fifth port 335. As another embodiment, each of the fourth port 334 and the fifth port 335 may be directly coupled to the second port 332. In this case, the switch circuit 330 may operate selectively using the first switching scheme, the second switching scheme, or the third switching scheme. For example, when the fourth port 334 is open, and the fifth port 335 is coupled to the second port 332, the switch circuit 330 may operate using the first switching scheme. When the fourth port 334 is directly coupled to the second port 332, and the fifth port 335 is open, the switch circuit 330 may operate using the second switching scheme. When the fourth port 334 is directly coupled to the second port 332, and the fifth port 335 is directly coupled to the second port 332, the switch circuit 330 may operate using the third switching scheme.

Figure 10:
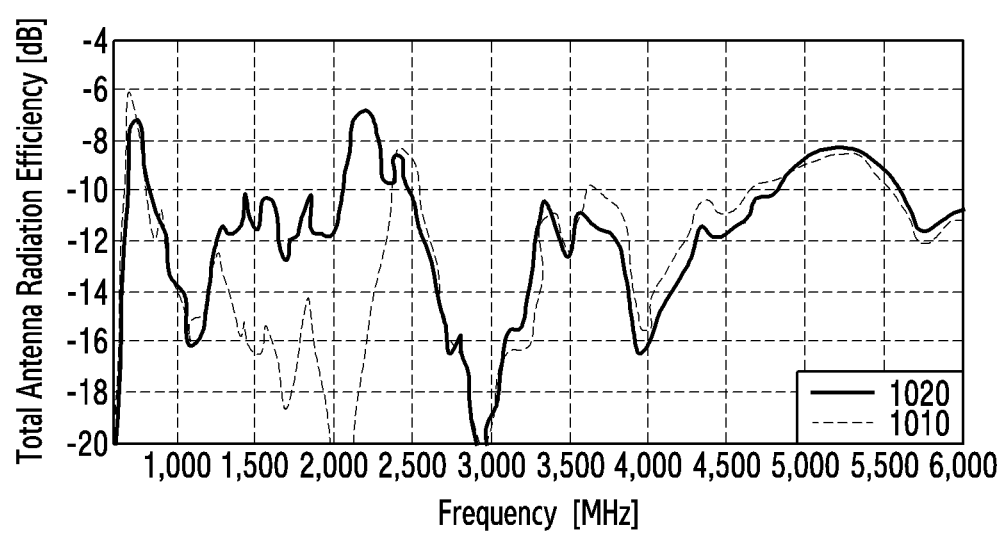
FIG. 10 illustrates a radiation feature of the first switching scheme and third switching scheme utilizing the second port according to an embodiment of the disclosure.

FIG. 10 illustrates a radiation feature of the first switching scheme and third switching scheme utilizing the second port according to an embodiment of the disclosure.

Referring to FIG. 10, an antenna radiation efficiency graph 1010 of the first switching scheme and an antenna radiation efficiency graph 1020 of the third switching scheme are illustrated. Hereinafter, the graphs are referred to as the first switching graph 1010 and the third switching graph 1020 in an orderly manner.

An antenna of the first switching graph 1010 in a frequency band of 1300 to 2300 MHz approximately shows a low radiation efficiency of −18 to −12 dB approximately, whereas an antenna of the third switching graph 1020 shows an improved radiation efficiency of −12 to −7 dB approximately. This shows that the radiation efficiency may be improved at a specific frequency band according to tuning of an antenna including a first portion (e.g., the first portion 1131 of FIGS. 4A and 4B) of a housing (e.g., the housing 110 of FIGS. 1A and 1B) since the switching scheme is changed from the first switching scheme to the third switching scheme.

An antenna of the third switching graph 1020 in a frequency band around 1300 to 2300 MHz approximately shows an improved radiation efficiency of −12 to −7 dB approximately. Comparing with a case where an antenna radiation efficiency improved band of the third switching graph 820 of FIG. 8 is 1500 to 2000 MHz approximately, this shows that a frequency band at which an antenna radiation efficiency is improved may vary depending on a matching time constant value of a lumped element (e.g., the first lumped element 410, of FIG. 4A, the second lumped element 420 of FIG. 4A, and the third lumped element 430 of FIG. 4A) electrically coupled to a fifth port (e.g., the fifth port 335 of FIG. 9A).

An antenna of the first switching graph 1010 in a frequency band around 300 MHz approximately shows a relatively high radiation efficiency of −8 to −7 dB approximately, whereas an antenna of the third switching graph 1020 shows a relatively low radiation efficiency of −8 to −7 dB approximately. In addition, comparing the first switching graph 1010 and the third switching graph 1020 at a frequency band around 3500 to 5000 MHz approximately, the antenna of the first switching graph 1010 shows a relatively high radiation efficiency. This shows that the radiation efficiency may be improved at a specific frequency band by using only the first switching scheme since a switch circuit (e.g., the switch circuit 330 of FIG. 9A) is changed from the third switching scheme to the first switching scheme.

Figure 11A:
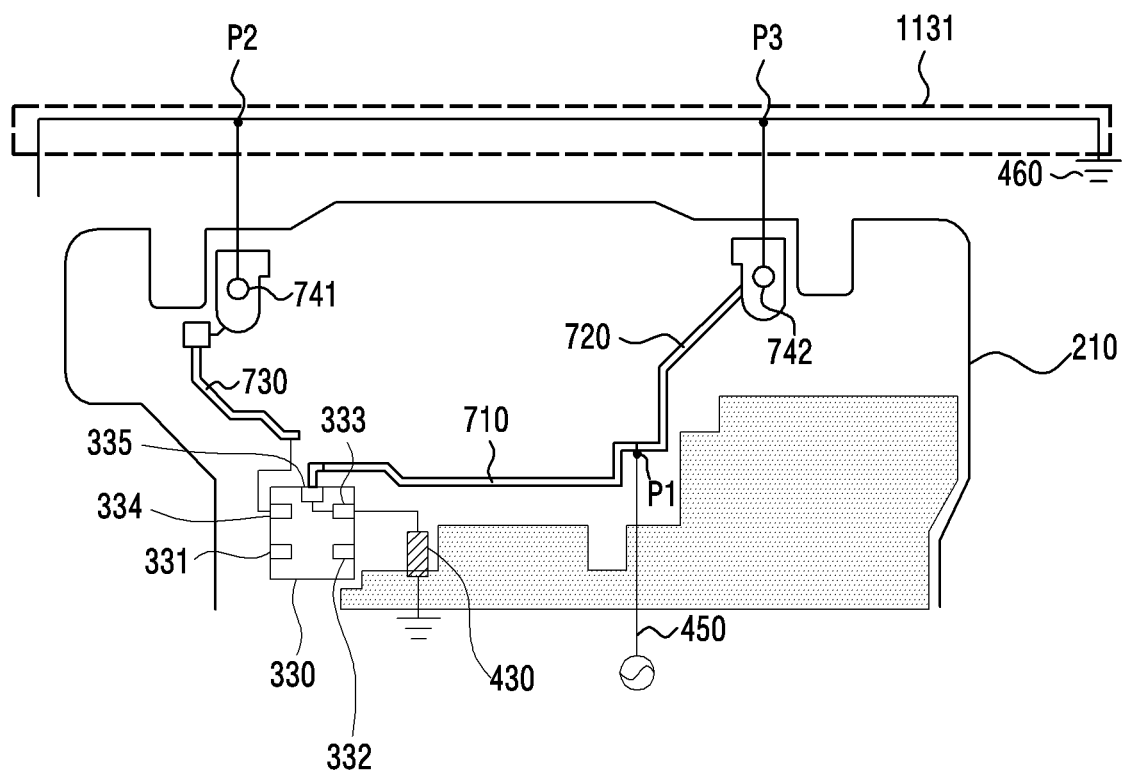
FIG. 11A is an internal circuit diagram of the first switching scheme utilizing a third port according to an embodiment of the disclosure.

FIG. 11A is an internal circuit diagram of the first switching scheme utilizing a third port according to an embodiment of the disclosure.

Figure 11B:
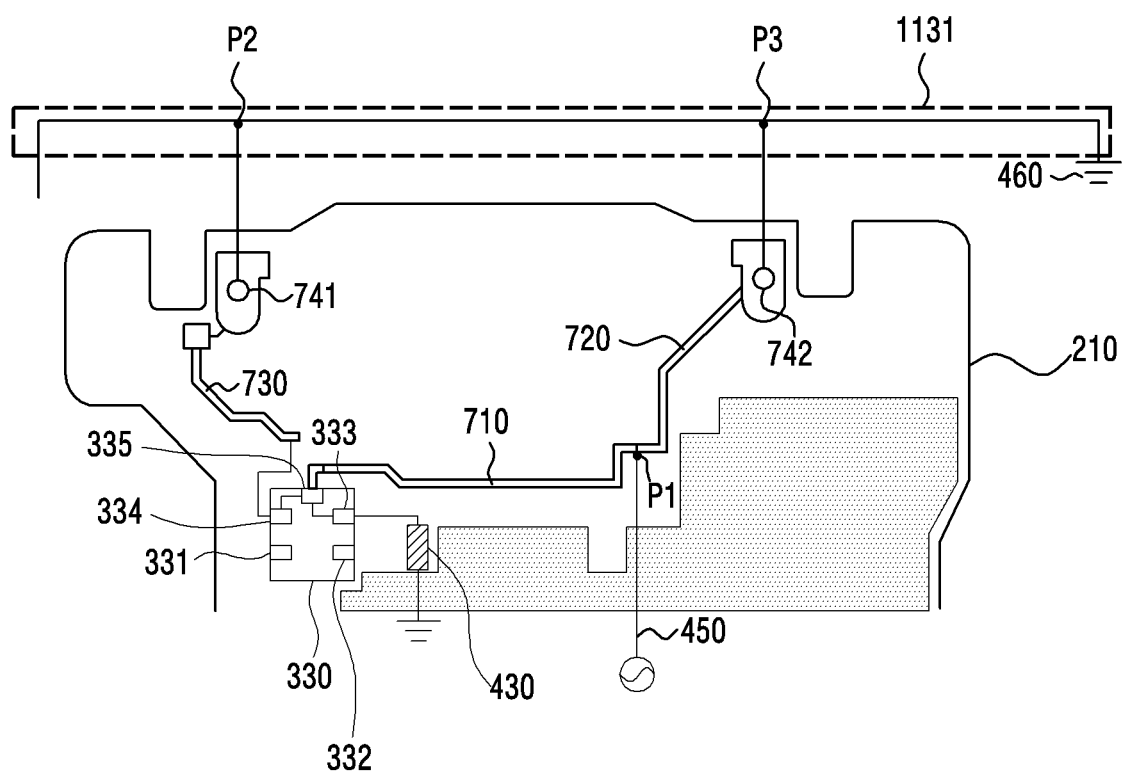
FIG. 11B is an internal circuit diagram of the third switching scheme utilizing the third port according to an embodiment of the disclosure.

FIG. 11B is an internal circuit diagram of the third switching scheme utilizing the third port according to an embodiment of the disclosure.

Referring to FIGS. 11A and 11B, the electronic device 100 according to an embodiment may include the third lumped element 430. The same/similar reference numerals have been used for the same or substantially the same components as those described above, and redundant descriptions will be omitted.

Referring to FIGS. 11A and 11B, the third port 333 according to an embodiment may be coupled to the third lumped element 430.

In an embodiment, a wireless communication circuit (e.g., the wireless communication circuit 320 of FIG. 3) may be coupled to the first portion 1131. For example, the wireless communication circuit may supply power to the third point P3 of the first portion 1131 through the second conductive trace 720 and the second coupling member 742. For example, the third point P3 may mean a point at which the first portion 1131 and the second coupling member 742 are coupled.

In an embodiment, the switch circuit 330 and the first portion 1131 of the housing 110 may be electrically coupled by means of the first conductive trace 710, the second conductive trace 720, and/or the second coupling member 724.

In an embodiment, the feeding path 450 may include the second coupling member 742 or the second conductive trace 720.

In an embodiment, an electrical coupling relation may vary depending on the fourth port 334. For example, referring to FIG. 11A, the fourth port 334 may be open not to be coupled to the fifth port 335, and thus the third port 333 coupled to the fifth port 335 may not be electrically coupled to the fourth port 334. In this case, the switch circuit 330 may operate using the first switching scheme. As another example, referring to FIG. 11B, the fourth port 334 may be coupled to the fifth port 335, and the third port 333 coupled to the fifth port 335 may be electrically coupled to the fourth port 334. In this case, the switch circuit 330 may operate using the third switching scheme.

Referring to FIG. 11B, as an embodiment, the fourth port 334 may be coupled to the fifth port 335, and may be electrically coupled to the third port 333 coupled to the fifth port 335. As another embodiment, each of the fourth port 334 and the fifth port 335 may be directly coupled to the third port 333. In this case, the switch circuit 330 may operate selectively using the first switching scheme, the second switching scheme, or the third switching scheme. For example, when the fourth port 334 is open, and the fifth port 335 is coupled to the third port 333, the switch circuit 330 may operate using the first switching scheme. When the fourth port 334 is directly coupled to the third port 333, and the fifth port 335 is open, the switch circuit 330 may operate using the second switching scheme. When the fourth port 334 is directly coupled to the third port 333, and the fifth port 335 is directly coupled to the third port 333, the switch circuit 330 may operate using the third switching scheme.

Figure 12:
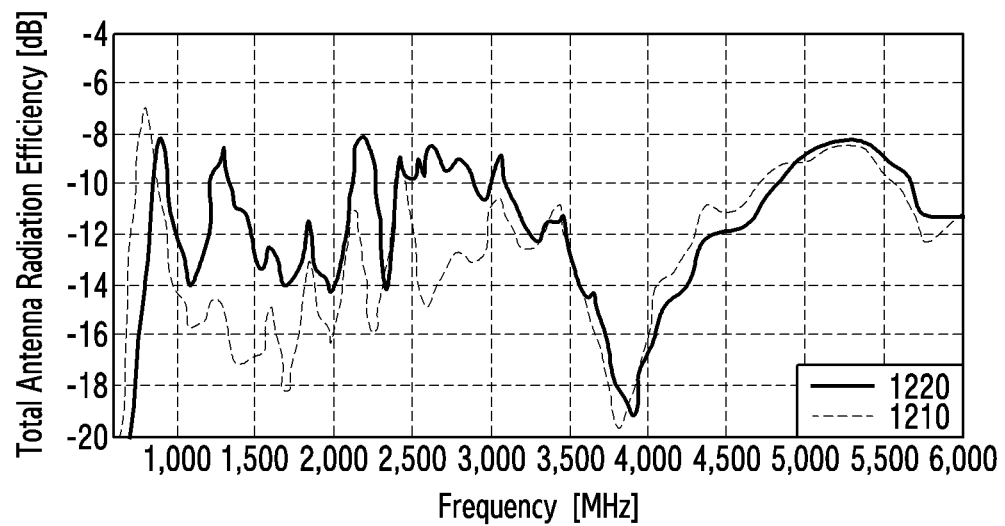
FIG. 12 illustrates a radiation feature of the first switching scheme and third switching scheme utilizing the third port according to an embodiment of the disclosure.

FIG. 12 illustrates a radiation feature of the first switching scheme and third switching scheme utilizing the third port according to an embodiment of the disclosure.

Referring to FIG. 12, an antenna radiation efficiency graph 1210 of the first switching scheme and an antenna radiation efficiency graph 1220 of the third switching scheme are illustrated. Hereinafter, the graphs are referred to as the first switching graph 1210 and the third switching graph 1220 in an orderly manner, and the antenna radiation may be interpreted to be the same as the radiation efficiency.

An antenna of the first switching graph 1210 in a frequency band around 2500 to 3000 MHz approximately shows a low radiation efficiency of −15 to −12 dB, whereas an antenna of the third switching graph 1220 shows an improved radiation efficiency of −10 to −9 dB approximately. In addition, an antenna of the third switching graph 1220 in a frequency band of 800 to 2300 MHz approximately shows a relatively high radiation efficiency of −14 to −8 dB approximately. For example, the antenna shows a high radiation efficiency of −8 dB around 800 MHz approximately, whereas the antenna of the first switching graph 1210 shows a relatively low radiation efficiency of −18 to −11 dB approximately. This shows that the radiation efficiency may be improved at a specific frequency band with the construction of a new resonance path in a first portion (e.g., 1131 of FIG. 11A) since the switching scheme is changed from the first switching scheme to the third switching scheme.

The antenna of the first switching graph 1210 at a frequency band of 500 MHz approximately has a radiation efficiency of −7 dB approximately, and thus has a relatively higher radiation efficiency than the third switching graph 1220. This shows that the radiation efficiency may be improved at a specific frequency band by using only the first switching scheme since the switching scheme is changed from the third switching scheme to the first switching scheme.

Figure 13:
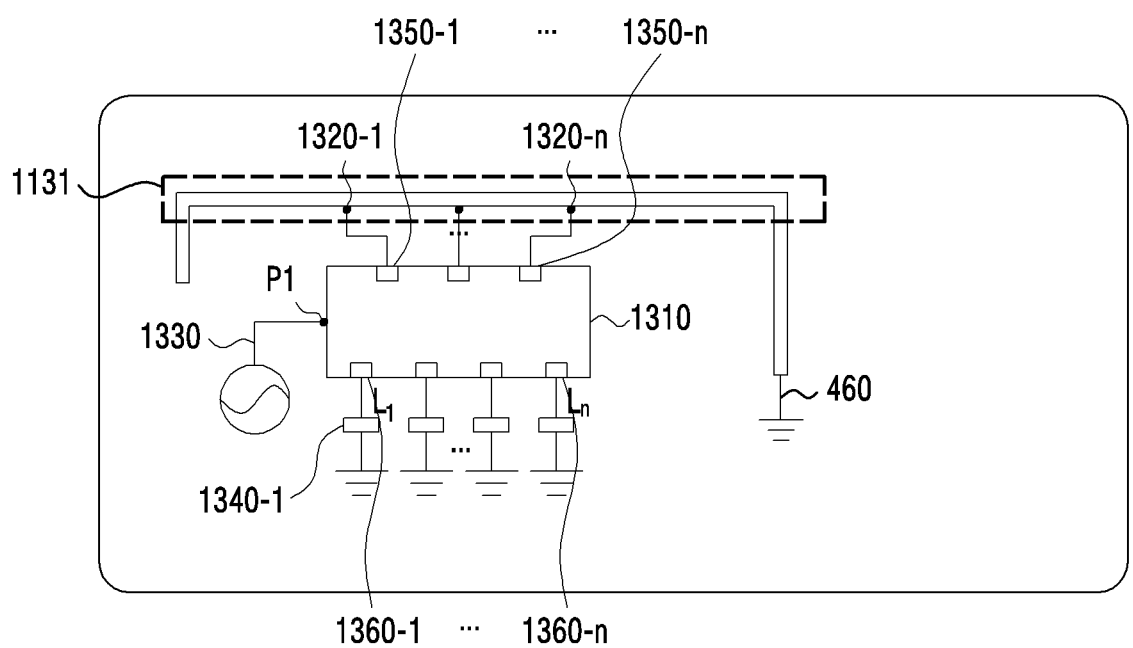
FIG. 13 illustrates a hybrid antenna switching structure according to an embodiment of the disclosure.

FIG. 13 illustrates a hybrid antenna switching structure according to an embodiment of the disclosure.

Referring to FIG. 13, the electronic device 100 according to an embodiment may include a switch circuit 1310, the first portion 1131, a feeding path 1330 from a wireless communication circuit (e.g., the wireless communication circuit 320 of FIG. 3), the ground 460, and at least one of lumped elements 1340-1 to 1340-n. In an embodiment, the switch circuit 1310 may include ports 1360-1 to 1360-n coupled to at least one of the lumped elements 1340-1 to 1340-n. As another example, the switch circuit 1310 may include ports 1350-1 to 1350-n coupled to the first portion 1131 through a conductive material. Hereinafter, the ports 1350-1 to 1350-n coupled to the first portion 1131 through the conductive material are referred to as first port groups 1350-1 to 1350-n, and the ports 1360-1 to 1360-n coupled to at least one of the lumped elements 1340-1 to 1340-n are referred to as second port groups 1360-1 to 1360-n.

In an embodiment, the first portion 1131 may be coupled to the ground 460 at one end of the first portion 1131 through the conductive material. The switch circuit 1310 may be coupled to the first portion 1131 at one or more points 1320-1 to 1320-n through the first port groups 1350-1 to 1350-n, and the feeding path 1330 from the wireless communication circuit may be electrically coupled to the switch circuit 1310 at the first point P1. The lumped elements 1340-1 to 1340-n may be electrically coupled to the switch circuit 1310 and the ground 460. In this case, the lumped elements 1340-1 to 1340-n may be coupled to the switch circuit 1310 through the second port groups 1360-1 to 1360-n.

In another embodiment, at least one of the lumped elements 1340-1 to 1340-n may be disposed inside the switch circuit 330.

In an embodiment, the at least one of the points 1320-1 to 1320-n at which the switch circuit 1310 is coupled to the first portion 1131 may be spaced apart from one another.

In an embodiment, the conductive material extending at one end of the first portion 1131 may be constructed of a conductive material (e.g., metal).

In an embodiment, the switch circuit 1310 additionally constructs at least one resonance path by being coupled to the first portion 1131 at the one or more points 1320-1 to 1320-n, thereby increasing an antenna radiation efficiency at a first frequency band. In an embodiment, the one or more lumped elements 1340-1 to 1340-n may include an inductor, a capacitor, or combination thereof. Descriptions on the lumped elements (e.g., 410, 420, and 430 of FIG. 4A) may be applied to the one or more lumped elements 1340-n to 1340-n.

FIG. 14 is a block diagram illustrating an electronic device 1401 in a network environment 1400 according to an embodiment of the disclosure.

Referring to FIG. 14, the electronic device 1401 in the network environment 1400 may communicate with an electronic device 1402 via a first network 1498 (e.g., a short-range wireless communication network), or at least one of an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, memory 1430, an input module 1450, a sound output module 1455, a display module 1460, an audio module 1470, a sensor module 1476, an interface 1477, a connecting terminal 1478, a haptic module 1479, a camera module 1480, a power management module 1488, a battery 1489, a communication module 1490, a subscriber identification module (SIM) 1496, or an antenna module 1497. In some embodiments, at least one of the components (e.g., the connecting terminal 1478) may be omitted from the electronic device 1401, or one or more other components may be added in the electronic device 1401. In some embodiments, some of the components (e.g., the sensor module 1476, the camera module 1480, or the antenna module 1497) may be implemented as a single component (e.g., the display module 1460).

The processor 1420 may execute, for example, software (e.g., a program 1440) to control at least one other component (e.g., a hardware or software component) of the electronic device 1401 coupled with the processor 1420, and may perform various data processing or computation. According to one embodiment, as at least part of the data processing or computation, the processor 1420 may store a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), or an auxiliary processor 1423 (e.g., a graphics processing unit (GPU), a neural processing unit (NPU), an image signal processor (ISP), a sensor hub processor, or a communication processor (CP)) that is operable independently from, or in conjunction with, the main processor 1421. For example, when the electronic device 1401 includes the main processor 1421 and the auxiliary processor 1423, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display module 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423. According to an embodiment, the auxiliary processor 1423 (e.g., the neural processing unit) may include a hardware structure specified for artificial intelligence model processing. An artificial intelligence model may be generated by machine learning. Such learning may be performed, e.g., by the electronic device 1401 where the artificial intelligence is performed or via a separate server (e.g., the server 1408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input module 1450 may receive a command or data to be used by another component (e.g., the processor 1420) of the electronic device 1401, from the outside (e.g., a user) of the electronic device 1401. The input module 1450 may include, for example, a microphone, a mouse, a keyboard, a key (e.g., a button), or a digital pen (e.g., a stylus pen).

The sound output module 1455 may output sound signals to the outside of the electronic device 1401. The sound output module 1455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1460 may visually provide information to the outside (e.g., a user) of the electronic device 1401. The display module 1460 may include, for example, a display, a hologram device, or a projector and control circuitry to control a corresponding one of the display, hologram device, and projector. According to an embodiment, the display module 1460 may include a touch sensor adapted to detect a touch, or a pressure sensor adapted to measure the intensity of force incurred by the touch.

The audio module 1470 may convert a sound into an electrical signal and vice versa. According to an embodiment, the audio module 1470 may obtain the sound via the input module 1450, or output the sound via the sound output module 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, a HDMI connector, a USB connector, an SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to one embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The wireless communication module 1492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1492 may support a high-frequency band (e.g., the mmWave band) to achieve, e.g., a high data transmission rate. The wireless communication module 1492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1492 may support various requirements specified in the electronic device 1401, an external electronic device (e.g., the electronic device 1404), or a network system (e.g., the second network 1499). According to an embodiment, the wireless communication module 1492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1497 may transmit or receive a signal or power to or from the outside (e.g., the external electronic device) of the electronic device 1401. According to an embodiment, the antenna module 1497 may include an antenna including a radiating element composed of a conductive material or a conductive pattern formed in or on a substrate (e.g., a printed circuit board (PCB)). According to an embodiment, the antenna module 1497 may include a plurality of antennas (e.g., array antennas). In such a case, at least one antenna appropriate for a communication scheme used in the communication network, such as the first network 1498 or the second network 1499, may be selected, for example, by the communication module 1490 (e.g., the wireless communication module 1492) from the plurality of antennas. The signal or the power may then be transmitted or received between the communication module 1490 and the external electronic device via the selected at least one antenna. According to an embodiment, another component (e.g., a radio frequency integrated circuit (RFIC)) other than the radiating element may be additionally formed as part of the antenna module 1497.

According to various embodiments, the antenna module 1497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled with the second network 1499. Each of the electronic devices 1402 or 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, mobile edge computing (MEC), or client-server computing technology may be used, for example. The electronic device 1401 may provide ultra low-latency services using, e.g., distributed computing or mobile edge computing. In another embodiment, the external electronic device 1404 may include an internet-of-things (IoT) device. The server 1408 may be an intelligent server using machine learning and/or a neural network. According to an embodiment, the external electronic device 1404 or the server 1408 may be included in the second network 1499. The electronic device 1401 may be applied to intelligent services (e.g., smart home, smart city, smart car, or healthcare) based on 5G communication technology or IoT-related technology.

An electronic device according to an embodiment may include a housing, a printed circuit board disposed inside the housing and including a ground, a wireless communication circuit disposed to the printed circuit board, and a switch circuit. A first portion of the housing may be formed of a conductive material. The wireless communication circuit may be configured to supply power to the first portion of the housing through a feeding path. The switch circuit may include a first port coupled to a first point of the feeding path, a second port coupled to a second point of the first portion, and a third port coupled to the ground of the printed circuit board.

According to an embodiment, the switch circuit may include a first lumped element having a designated reactance value. The first lumped element may be coupled to the ground of the printed circuit board through the third port.

According to an embodiment, the switch circuit may further include a second lumped element having a second reactance value different from a first reactance value of the first lumped element. The second lumped element may be coupled to the ground of the printed circuit board through a fourth port.

According to an embodiment, the switch circuit may further include a capacitor having a designated capacitance value.

According to an embodiment, an insulating material may be disposed at both ends of the first portion of the housing.

The electronic device according to an embodiment may further include a display constructing a front face of the electronic device and coupled to the housing.

According to an embodiment, the printed circuit board may include a plurality of layers. The ground of the printed circuit board may be constructed on a first layer among the plurality of layers.

According to an embodiment, at least one lumped element may be disposed between the third port and the ground of the printed circuit board.

According to an embodiment, the switch circuit may be coupled to a third point that is spaced apart from the second point of the first portion of the housing.

According to an embodiment, the wireless communication circuit may be configured to control the switch circuit such that the first port and the third port are electrically coupled to control an impedance associated with reception of a signal of a first frequency band.

According to an embodiment, the wireless communication circuit may be further configured to control the switch circuit such that the second port and the third port are electrically coupled to receive a signal of a second frequency band different form the first frequency band.

The electronic device according to an embodiment may further include at least one processor operatively coupled to the switch circuit and the wireless communication circuit and configured to control at least one of the switch circuit and the wireless communication circuit.

The electronic device according to an embodiment may transition from a first state of receiving a first RF signal of the first frequency band to a second state of receiving a second RF signal of the second frequency band under the control of the at least one processor.

According to an embodiment, a radiation efficiency of a frequency band of 1500 to 2000 MHz may be improved under the control of the at least one processor.

A method performed by an electronic device for controlling an antenna according to an embodiment may be provided. A first portion of a housing of the electronic device may be constructed of a conductive material. The method may include supplying power, by a wireless communication circuit of the electronic device, to the first portion through a feeding path to receive a signal of a first frequency band, controlling a switch circuit of the electronic device such that a first point of the feeding path is electrically coupled to a ground of the electronic device through the switch circuit to control an impedance associated with reception of the signal of the first frequency band, and controlling the switch circuit such that the second point of the first portion is electrically coupled to the ground of the electronic device through the switch circuit to receive a signal of a second frequency band different from the first frequency band. The switch circuit may be selectively coupled to at least one of a first point of the feeding path and a second point of the first portion.

According to an embodiment, the electronic device may further include at least one processor operatively coupled to the switch circuit and the wireless communication circuit configured to control at least one of the switch circuit and the wireless communication circuit.

According to an embodiment, the electronic device may transition from a first state of receiving a first RF signal of the first frequency band to a second state of receiving a second RF signal of the second frequency band under the control of the at least one processor.

According to an embodiment, a radiation efficiency of a frequency band of 1500 to 2000 MHz may be improved under the control of the at least one processor.

According to an embodiment, an insulating material may be disposed to both ends of the first portion of the housing.

The electronic device according to an embodiment may further include a display constructing a front face of the electronic device and coupled to the housing.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing including a first portion including a conductive material;
a printed circuit board disposed inside the housing and including a ground;
a wireless communication circuit disposed on the printed circuit board and configured to supply power to the first portion of the housing through a feeding path; and
a switch circuit,
wherein the switch circuit includes:
a first port connected to a first point of the feeding path between the wireless communication circuit for supplying the power and a second point of the first portion,
a second port connected to a third point of the first portion, and
a third port connected to the ground of the printed circuit board.

2. The electronic device of claim 1,
wherein the switch circuit includes a first lumped element having a first reactance value, and
wherein the first lumped element is coupled to the ground of the printed circuit board through the third port.

3. The electronic device of claim 2,
wherein the switch circuit further includes a fourth port electrically connected to the ground,
wherein the switch circuit further includes a second lumped element having a second reactance value different from the first reactance value of the first lumped element,
wherein the second lumped element is connected to the ground of the printed circuit board through the fourth port, and
wherein the switch circuit further includes a capacitor having a designated capacitance value.

4. The electronic device of claim 1,
wherein the first portion includes a first end and a second end, and
wherein an insulating material is disposed at the first end and the second end of the first portion of the housing.

5. The electronic device of claim 1, further comprising:
at least one processor electrically coupled with the switch circuit and the wireless communication circuit and configured to control at least one of the switch circuit or the wireless communication circuit.

6. The electronic device of claim 5, wherein the at least one processor is further configured to control the electronic device to transition from a first state in which the wireless communication circuit receives a first radio frequency (RF) signal of a first frequency band to a second state in which the wireless communication circuit receives a second RF signal of a second frequency band.

7. The electronic device of claim 1, wherein, when the switch circuit is electrically connected with the third point of the first portion via the second port, the first portion is electrically connected to the ground via the second port and the third port.

8. The electronic device of claim 1, wherein, when the switch circuit is in a first switching scheme, the first port is electrically connected to the feeding path and the second port is disconnected from the first portion, and wherein, when the switch circuit is in a second switching scheme, the first port is electrically connected to the feeding path and the second port is electrically connected to the first portion.

9. The electronic device of claim 8, wherein, when the switch circuit is in a third switching mode, the first port is disconnected from the feeding path and the second port is electrically connected to the first portion.

10. The electronic device of claim 8, wherein, when the switch circuit is in the second switching scheme, the first port is electrically connected to the second port and the third port, and wherein, when the switch circuit is in the second switching scheme, the second port is electrically connected to the ground via the first port.

11. The electronic device of claim 8, wherein, when the switch circuit is in the second switching scheme, the first port is electrically connected to the ground via the third port, and wherein, when the switch circuit is in the second switching scheme, the second port is electrically connected to the ground via the third port.

12. The electronic device of claim 11, wherein the switch circuit is coupled to a fourth point of the first portion that is spaced apart from the third point of the first portion, wherein the wireless communication circuit is configured to control the switch circuit to connect the first port and the third port for controlling an impedance associated with reception of a signal of a first frequency band, and wherein the wireless communication circuit is further configured to control the switch circuit to connect the second port and the third port for receiving a signal of a second frequency band different form the first frequency band.

* * * * *